(12) United States Patent
Chen et al.

(10) Patent No.: US 7,287,180 B1
(45) Date of Patent: Oct. 23, 2007

(54) HARDWARE INDEPENDENT HIERARCHICAL CLUSTER OF HETEROGENEOUS MEDIA SERVERS USING A HIERARCHICAL COMMAND BEAT PROTOCOL TO SYNCHRONIZE DISTRIBUTED PARALLEL COMPUTING SYSTEMS AND EMPLOYING A VIRTUAL DYNAMIC NETWORK TOPOLOGY FOR DISTRIBUTED PARALLEL COMPUTING SYSTEM

(75) Inventors: Monsong Chen, Katonah, NY (US); Bodhi Mukherjee, Hopewell JN, NY (US); Alex Chen, Edison, NJ (US); Aparna Pappu, New York, NY (US)

(73) Assignee: Info Value Computing, Inc., Elms Gord, NY (US)

( * ) Notice: Subject to any disclaimer, the term of this patent is extended or adjusted under 35 U.S.C. 154(b) by 597 days.

(21) Appl. No.: 10/804,657

(22) Filed: Mar. 19, 2004

Related U.S. Application Data

(60) Provisional application No. 60/456,098, filed on Mar. 20, 2003.

(51) Int. Cl.
*G06F 11/00* (2006.01)

(52) U.S. Cl. .................. 714/4; 714/5; 714/11; 714/12; 714/13; 714/43

(58) Field of Classification Search .................. 714/4, 714/5, 11, 12, 13, 43
See application file for complete search history.

(56) References Cited

U.S. PATENT DOCUMENTS

| | | | |
|---|---|---|---|
| 5,550,577 A | 8/1996 | Verbiest et al. ................. | 348/7 |
| 5,712,976 A | 1/1998 | Falcon, Jr. et al. ..... | 395/200.09 |
| 5,805,821 A | 9/1998 | Saxena et al. ......... | 395/200.61 |
| 6,085,238 A * | 7/2000 | Yuasa et al. ................. | 709/223 |
| 6,101,547 A | 8/2000 | Mukherjee et al. ......... | 709/231 |
| 2002/0174207 A1* | 11/2002 | Battou ........................ | 709/223 |
| 2004/0162901 A1* | 8/2004 | Mangipudi et al. ......... | 709/225 |

OTHER PUBLICATIONS

"Performance Evaluation of QuickVideo OnDemand (QVOD) Server", Info Value Computing, Inc., Tech. Report IV-TR-QVOD-1999-07-1-1, Jul. 8, 1999, Info Value Computing Inc., Elmsford, NY.

"Network Video Computing Via QuickVideo Suite", Info Value Tech. White Paper, Info Value Computing, Inc., Elmsford, NY, 1999.

"Web Distribution Systems: Caching and Replication" Chandbok, Ohio State University, 1999, found: http://www.cis.ohio-state.edu/~jain/cis788-99/web_caching/index.html, Aug. 15, 2000.

\* cited by examiner

*Primary Examiner*—Bryce P. Bonzo
*Assistant Examiner*—Joseph D Manoskey
(74) *Attorney, Agent, or Firm*—Saile Ackerman LLC; Stephen B. Ackerman; Billy Knowles

(57) ABSTRACT

A video distribution system is implemented on a hierarchical parallel processing system that has clusters that are automatically formed from nodes of computer processing systems. Each cluster has a cluster supervising processor or group leader system that controls cluster configuration, fault detection and isolation, and data distribution. The group leader is determined according to a priority determined during the configuring of the hierarchical parallel processing system. The clusters are able to be reconfigured to allow removal and addition of nodes without impact on operation of the parallel processor system. The cluster provide a node status or heartbeat message that which provides detection and isolation of failure of nodes and disk storage devices within a cluster. The nodes within the cluster are able to join or leave a cluster and not affect performance.

66 Claims, 15 Drawing Sheets

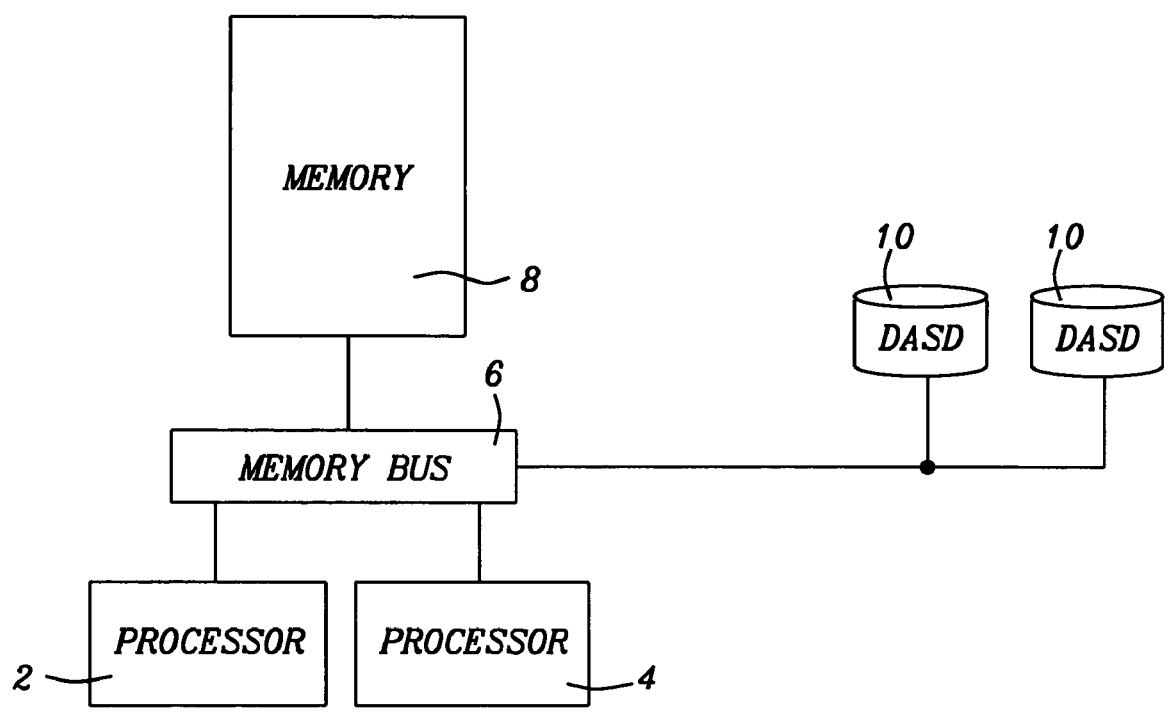
FIG. 1 - Prior Art

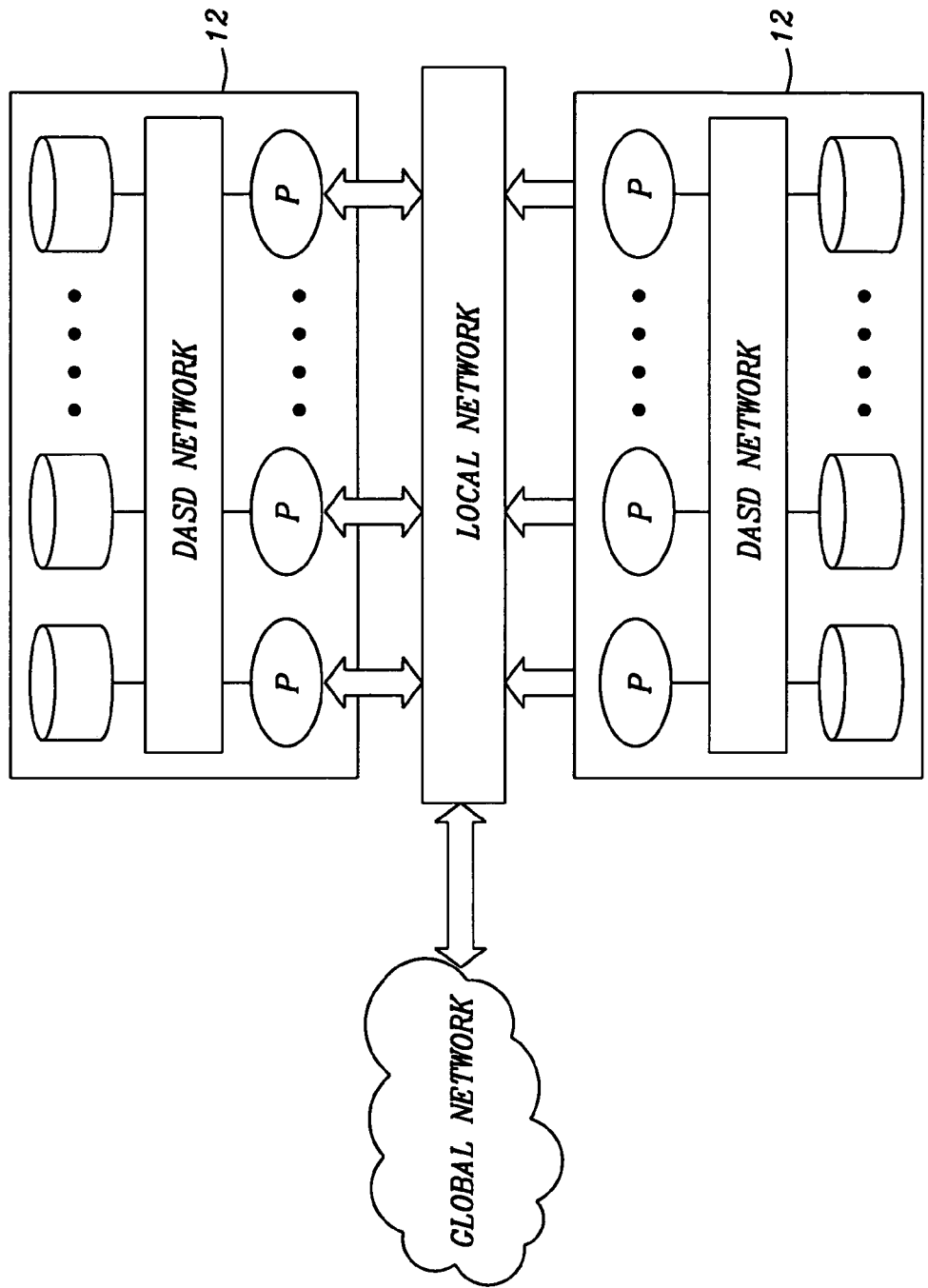
FIG. 2 - Prior Art

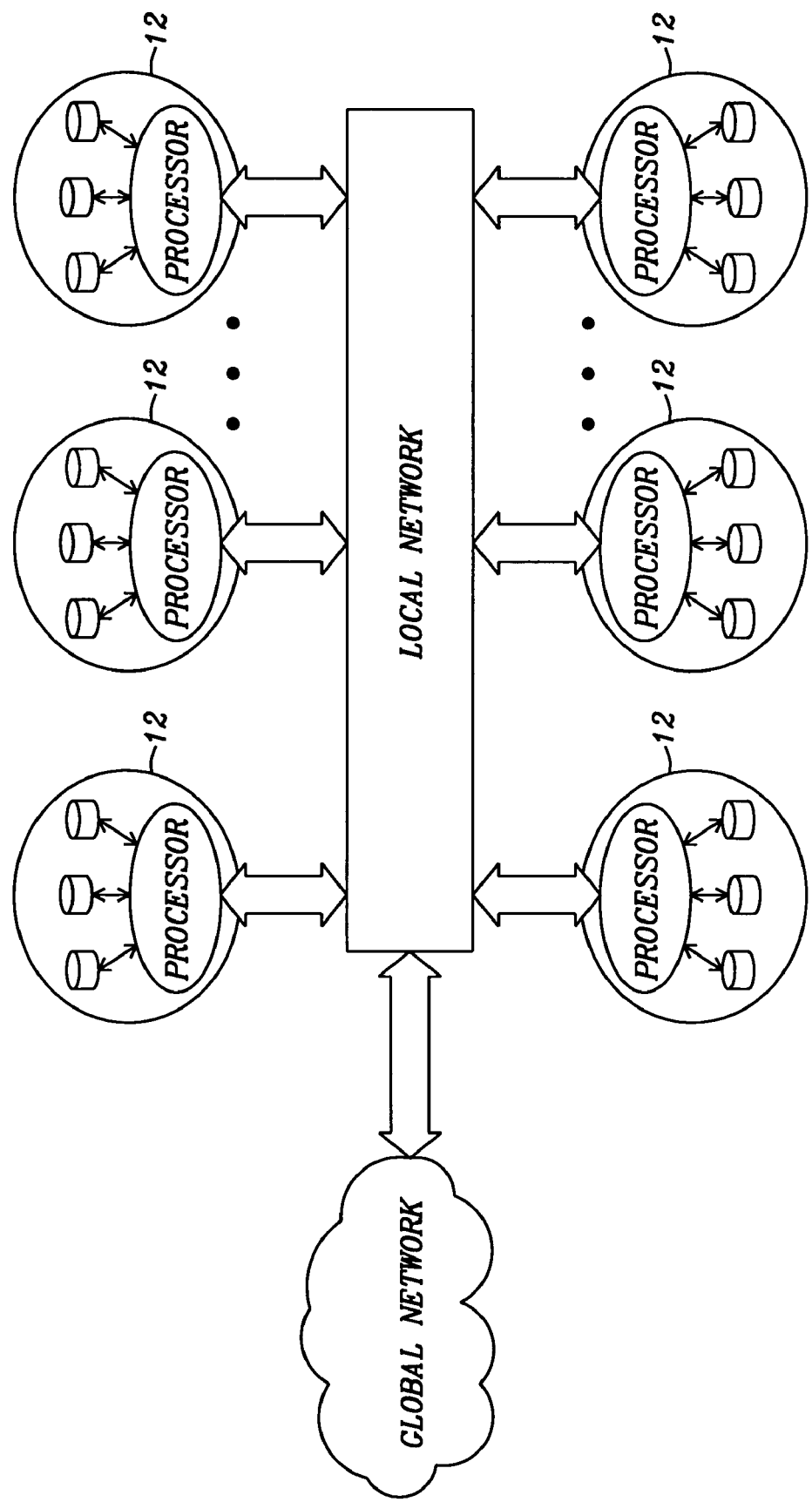
FIG. 3 – Prior Art

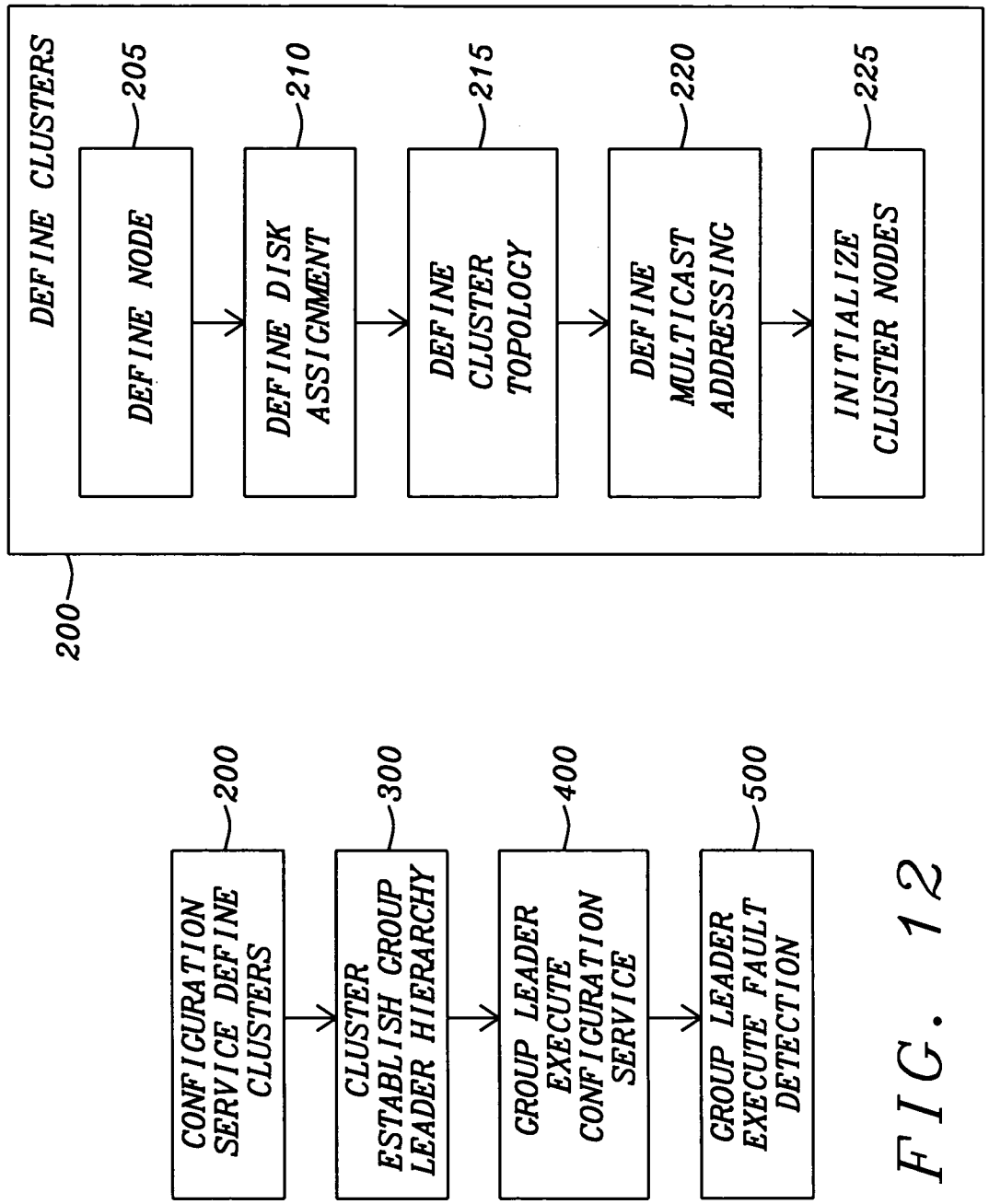

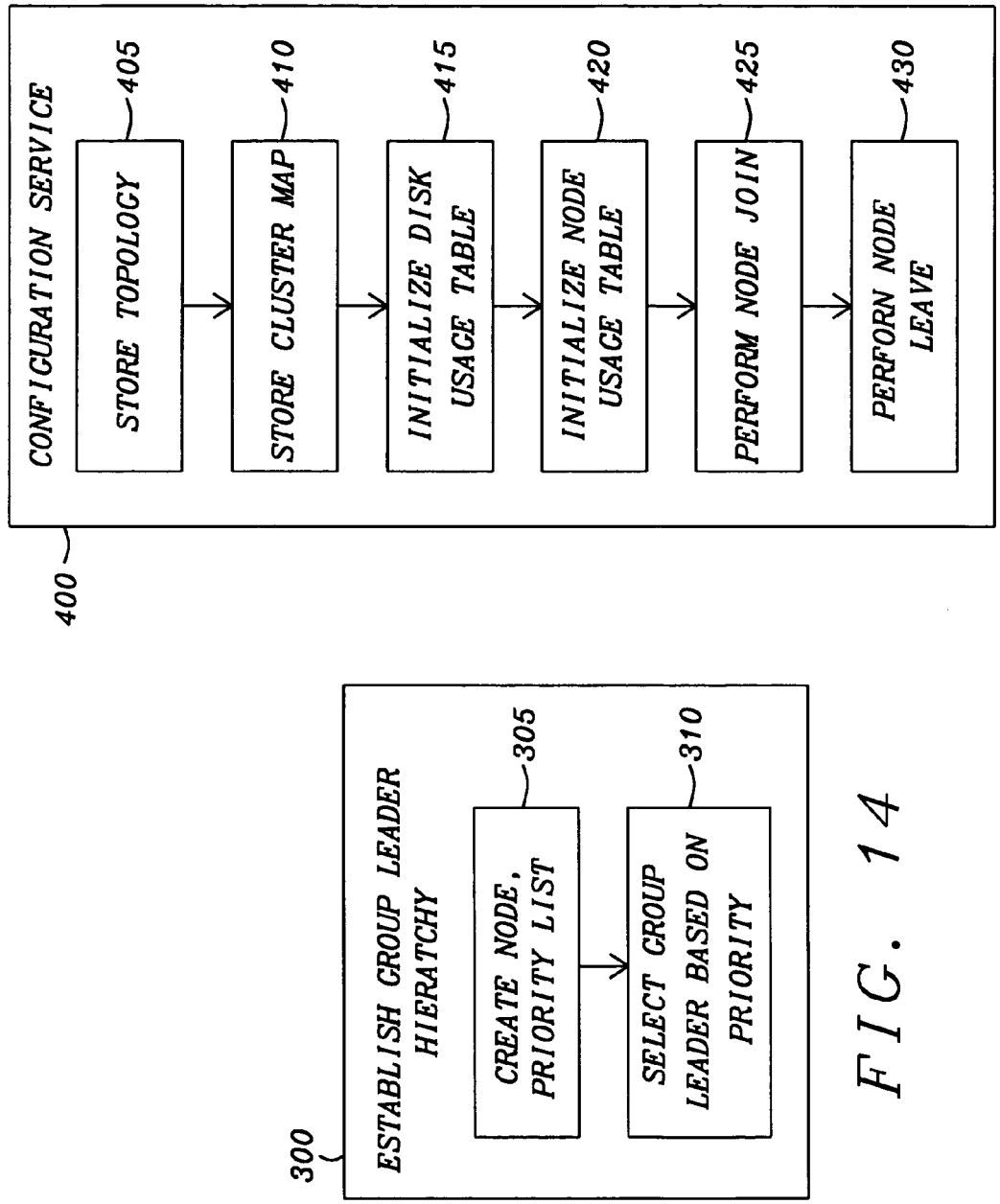

US 7,287,180 B1

HARDWARE INDEPENDENT HIERARCHICAL CLUSTER OF HETEROGENEOUS MEDIA SERVERS USING A HIERARCHICAL COMMAND BEAT PROTOCOL TO SYNCHRONIZE DISTRIBUTED PARALLEL COMPUTING SYSTEMS AND EMPLOYING A VIRTUAL DYNAMIC NETWORK TOPOLOGY FOR DISTRIBUTED PARALLEL COMPUTING SYSTEM

This application claims priority to U.S. Provisional Patent Application Ser. No. 60/456,098, filed on Mar. 20, 2003, which is herein incorporated by reference.

RELATED PATENT APPLICATIONS

"A Video Distribution System Using Segments," Ser. No. 09/748,442, Filing Date Dec. 27, 2001, assigned to the same assignee as this invention.

"A Video Distribution System Using Dynamic Segmenting of Video Files," Ser. No. 09/748,304, Filing Date Dec. 27, 2001, assigned to the same assignee as this invention.

"Streaming While Fetching Broadband Video Objects Using Heterogeneous And Dynamic Optimized Segmentation Size" U.S. Provisional Patent Application Ser. No. 60/456,099, Filing Date Mar. 20, 2003.

"A System and Method for Scheduling Transfer of Video Files in Computing Video Server System," U.S. Provisional Patent Application Ser. No. 60/456,096, Filing Date Mar. 20, 2003, "A Video Distribution System Using Disk Load Balancing by File Copying," Ser. No. 10/025,242, Filing Date Dec. 19, 2001, assigned to the same assignee as this invention.

"A Video Distribution System Using Dynamic Disk Load Balancing with Variable Segmenting," Ser. No. 10/027,991, Filing Date Dec. 20, 2001, assigned to the same assignee as this invention.

BACKGROUND OF THE INVENTION

1. Field of the Invention

This invention relates to the connection and control of distributed parallel computing systems. More particularly this invention relates to connection and control of networked connected computer systems to form a virtual network structure for large multiprocessing systems.

2. Description of Related Art

In the past, video streaming servers required that a file be fully present before the sever could start streaming the file. This imposed a considerable restriction as typical DVD or broadcast quality videos may be several Gigabytes in size and thus imposed a large latency before a viewer could start viewing a video.

Video is the most dominant medium in entertainment and is rapidly becoming a critical part of computing as well. Video is often used in CD-ROM titles, for example, to mimic personal or virtual environments, increasing an application's appeal and usability. Video has a large information carrying capacity and is heavily used in capturing and conveying complicated situations such as news events, live interviews, scientific experiments, tourist attractions, and many others.

With the increasing availability of high bandwidth networks, video on-demand applications are gaining popularity on global digital communications networks such as the Internet as well as private and corporate digital communication internal networks commonly referred to as Intranets. Example applications include online training, news broadcasts, educational programming, corporate information, and virtual seminars directly to every desktop computing system or workstation. Similarly, video kiosks can be set up in enterprises and university campuses to display live video and up-to-the-minute news, without ever needing an on-site upgrade.

Video files, however, occupy huge amounts of space on computers. It requires about 10 MB to store one minute of video in most standard compression and decompression video formats, including Motion Picture Experts Group standard MPEG-1, the Apple Computer Inc. Indeo, Intel Corp. QuickTime, and Super Mac, Inc Cinepak. That translates into 1.2 GB of space for two hours of video, the length of an average feature film. These tremendous storage requirements make effective on-demand sharing of video files at least as important as conventional file sharing.

However, conventional file servers do not address video's unique requirements and cannot effectively support video sharing. Full-motion video, inherited from analog TV, is a sequence of images played out at constant intervals. The two most common analog video formats are the National Television Standards Committee (NTSC), used in the United States and Japan, and Phase Alternation Standard (PAL), used in Europe. NTSC plays video at 30 frames per second, while PAL plays it at 25 frames per second. The sequence of images in a video clip must be relayed at a constant interval, or else the perceptual quality degrades rapidly: the motion jumps and the sound breaks. This rigid periodic timing property is referred to as the isochronous requirement. Conventional file servers are designed for minimal transfer latency. Files are thus transferred to maintain the minimum latency and are transferred as quickly as possible. The files will be interleaved with other digital communication traffic on the network and thus non-isochronously. Without explicit mechanisms to ensure isochronism, delivery rates are irregular, resulting in erratic playback quality at the client computing system.

To avoid erratic playback, the usual approach is to download whole files from the server to the client computing system before starting video playback. This approach results in unacceptable delays for most video files, which are large. For example, even with transfer rates as fast as 1.5 Mb/second, the initial start-up delay is 60 seconds for a one minute video clip.

It is thus desirable to deliver video streams isochronously so that video playback is guaranteed to have smooth motion and sound. The file server must now transfer or stream the files such that the time between each section of the file is transferred at a period of time. The even interval allows the file to arrive isochronously with the first section to be displayed before any of the remaining sections of the file have arrived at the client system. This allows a video clip to begin practically instantaneously.

The rapid advances in the speeds of microprocessors, storage, and network hardware may give a false impression that video on-demand (VOD) solutions do not need special purpose video streaming software. Video streaming allows efficient playback of full motion videos over networks with guaranteed quality using isochronous timing.

When an operating system's default file transfer mode is used to stream a video file, faster hardware may accelerate the operating system's transfer rate, but this improved hardware still cannot change the fundamental, erratic behavior of a file transfer. By default, the file transfer process does not respect the isochronous nature of a video stream. This typically results in a jerky and poor-quality playback of a video stream. The dominant factors of a system's overall streaming performance are the higher level client/server and networking processes, and are not the raw power of the low level physical devices.

U.S. Pat. No. 5,805,821 (Saxena, et al.) teaches a video optimized media streamer user interface employing non-blocking switching to achieve isochronous data transfers. The media streamer includes at least one control node; a user interface having an output coupled to the at least one control node; at least one storage node for storing a digital representation of at least one video presentation; and a plurality of communication nodes each having an input port for receiving a digital representation of at least one video presentation there from. The video presentation requires a time T to present in its entirety, and is stored as a plurality of N data blocks. Each data block stores data corresponding to a T/N period of the video presentation. Each communication nodes further has a plurality of output ports for outputting a digital representation. A circuit switch is connected between the at least one storage node and the input ports of communication nodes for coupling one or more input ports to the at least one storage node. The user interface includes a capability for specifying commands for execution, and the at least one control node is responsive to individual ones of the commands for controlling at least one of the at least one storage node and at least one of the plurality of communication nodes, in cooperation with the circuit switch, so as to execute a function associated with individual ones of the commands. The commands may include video cassette recorder-like commands that include commands selected from a group that includes a Load command, an Eject command, a Play command, a Slow command, a Fast Forward command, a Pause command, a Stop command, a Rewind command, and a Mute command. The commands may also include commands selected from a group that includes a Play List command, a Play Length command, and a Batch command. A synchronous application program interface (API) is provided for coupling, via the user interface, a user application program to the at least one control node. The API includes Remote Procedure Call (RPC) procedures.

U.S. Pat. No. 5,550,577 (Verbiest, et al.) illustrates a video on demand network, including a central video server and distributed video servers with random access read/write memories. The video on demand network transmits video signals to user stations pursuant to the receipt of control signals issued by these user stations. In order to optimize the retrieval costs, this video on demand network maintains a large video library in a central video server and stores locally popular video signals in a plurality of local distributed video servers from which the latter video signals are transmitted to the user stations. The video signals provided by the local distributed servers are updated from the central server based upon the changing popularity of the video signals. The video on demand network of Verbiest proposes in particular to store the video signals in the local distributed servers in random access read/write memories, e.g., electronic RAMs, magnetic or optical disks from which the video signals can flexibly be supplied on-line to the user stations and to store the video signals in the central server in sequential access memories, e.g. Digital Audio Tapes (DAT) and CD-ROMs (CDR), providing cheap mass storage.

U.S. Pat. No. 5,712,976 (Falcon, Jr., et al.) illustrates a video data streamer for simultaneously transferring data blocks stored from a storage node to any of multiple communication nodes. The media streamer includes at least one storage node including mass storage for retaining a digital representation of at least one video presentation. The mass storage is comprised of a plurality of mass storage units. A video presentation requires a time T to present in its entirety, and is stored as a plurality of N data blocks. Each data block stores data corresponding to approximately a T/N period of the video presentation. The media streamer further includes a plurality of communication nodes each having at least one input port that is coupled to an output of the storage node for receiving a digital representation of a video presentation there from. Each of the plurality of communication nodes further includes a plurality of output ports. Each output port transmits a digital representation as a data stream to a consumer of the digital representation. The N data blocks of the digital representation are partitioned into X stripes, wherein data blocks 1, X+1, 2*X+1, etc., are associated with a first one of the X stripes, data blocks 2, X+2, 2*X+2, etc., are associated with a second one of the X stripes, etc., and wherein individual X stripes are each stored on a different mass storage unit. The mass storage units preferably store a single copy of a digital representation of a video presentation. The X stripes are read out in such a manner as to enable multiple data streams to simultaneously convey the N data blocks, or are read out in such a manner as to enable multiple data streams to simultaneously convey different data blocks.

U.S. Pat. No. 6,101,547 (Mukherjee, et al.) describes an inexpensive, scalable and open-architecture media server. The multi-media server provides client systems with streaming data requiring soft real-time guarantee and static data requiring a large amount of storage space. The servers use a pull-mode protocol to communicate with client systems through a real-time network. Separate data and control channels enhance the soft real-time capability of the server. The data channel conforms to an open standard protocol such as such as Transmission Control Protocol (TCP), User Datagram Protocol (UDP), or Real-time Transport Protocol (RTP). A switched data link layer for the control channel permits separate intrahost control messages that may be multicast and broadcast. The distributed file system selects a specific data block size based upon the compression technique employed to enhance soft real-time guarantee. A hierarchical data structure combined with merging empty data blocks minimizes disk fragmentation. Data blocks are striped across multiple disks to improve disk utilization. A local buffer and a queue for both read and write requests provides support for simultaneous read and write data streams.

"Performance Evaluation of QuickVideo OnDemand (QVOD) Server," InfoValue Computing, Inc. Technical Report IV-TR-QVOD-1999-07-1-1, Jul. 8, 1999, InfoValue Computing, Inc., Elmsford, N.Y. describes a video on-demand system developed for high performance, effective and flexible, network-based, on-demand sharing of videos. QuickVideo On Demand provides streaming throughput for broadband applications Further, QuickVideo On Demand allows a linearly scalable clustering mechanism which provides support for higher throughputs, if required. Quick-Video On Demand supports all video formats, codecs, networks and applications, and is compatible with any open application platform.

"Network Video Computing Via QuickVideo Suite," InfoValue Technical White Paper, InfoValue Computing, Inc., Elmsford, N.Y., 1999, describes Network Video Computing the core of which is video streaming. Video streaming allows the efficient playing of full-motion video content over networks with guaranteed quality. The rigid timing property of full motion video is referred to as the isochronous timing.

File servers are designed to minimize transfer latency during conventional network transfers, and are insensitive to video's unique timing requirement. As a result, delivery rates are irregular and produce erratic playback as described above. Video streaming technologies are real-time network transfers that maintain the video's critical timing property throughout the entire delivery period. This white paper describes an open architecture with a streaming core.

"Web Distribution Systems: Caching and Replication" Chandbok, Ohio State University, 1999, found http://www-.cis.ohio-state.edu/~jain/cis788-99/web_caching/index.html, Aug. 15, 2000, provides an overview of the current techniques for caching and replication of digital data on computer systems interconnected through a global or local digital communication network.

As described above, video files may be very large, on the order of 1.2 GB for a two hour movie or video presentation. In the digital communication networks, the files are generally formed into data packets for transfer. These data packets may not arrive to a designated client system in correct order for processing. This requires reception of the complete file before processing may begin. If the file is an audio or video file requiring isochronous presentation of the file, the files must be totally received before processing or the files must be segmented or partitioned into portions to allow smaller units of the files to be processed.

The simplest computing system, as shown in FIG. 1, consists of a single processor 2, its memory 8 and associated external storage media 10 usually implemented as some form of magnetic direct access storage device (DASD). The performance of this system is determined by the speed of the processor 2, the characteristics of the memory bus 6 (bandwidth and latency), the size of the memory 8 and the performance of the DASD 10 which is determined by such factors as seek access time and the bandwidth of the connection to memory 8. Such a machine is referred to a uniprocessor system. At any given time the state of the semiconductor processing technology determines the maximum performance of such a machine. Efforts to achieve performance above that available to the current technology involve the introduction of multiple disks, processors, and memories.

The first way that performance can be improved beyond that of a simple uniprocessor system is by adding processors 4 as shown in FIG. 1. Such a machine is called a symmetric multiprocessor (SMP). Such machines can, theoretically, multiply the performance of a uniprocessor by the number of processors 4 that are added. As the number of processors 4 increases, this does not occur because of competition for resources, both logical and physical, by the processors.

In an SMP design, the memory bus 6 bandwidth may not be sufficient to meet the needs of all the processors 2 and 4 seeking data from memory 8. The bus 8 bandwidth can be increased by using more aggressive technology, but this method of increasing performance is limited. Often caches are added to the memory subsystem that is associated with each processor. In this way, as long as the fetch requests of the processors 2 and 4 are not directed at the same address ranges, contention for the memory bus 8 is avoided. When various caches contain the same object and the object is changed by a processor 2 and 4, then the objects in the other caches must be invalidated. This problem limits the number of processors 2 and 4 that can be supported in an SMP design. Another way to increase SMP performance to introduce interleaved memory. In an interleaved memory 8, the memory 8 is divided into banks so that simultaneous requests to separate banks are supported. This adds significant complexity and cost to the memory subsystem and so it is a limited solution that does not scale indefinitely. In addition the operating system design that runs on SMP machines becomes complex difficult and time consuming to implement. Despite these difficulties the SMP design is a popular way to increase performance.

Another way to increase performance is to cluster machines on some kinds of network, as shown in FIGS. 2 and 3. In a cluster, the machines within the cluster are called nodes 12. It will be noted that these nodes 12 may actually be clusters of processors themselves. Many networks have been used for this purpose. These networks can be divided into two types. These two types are topology transparent and topology visible.

FIG. 4a illustrates a network where the topology is visible. The nodes 16 are connected in a topology where the communication bandwidth and distance between nodes 16 is not uniform, the topology is visible. In a topology visible network, the topology of the network shows through to the application and can affect performance. This is usually because the latency and/or bandwidth existing between any two processors (nodes 16) on the network are not the same for all pairs of processors. Examples of such networks include two dimensional meshes and n dimensional cubes. One of the drawbacks of these schemes is that the mapping of tasks onto the topology becomes a performance issue. This is, in general, thought to be an NP problem, but for restricted sets of applications this type of network may be used.

In the topology transparent network, as shown in FIG. 4b, the latency and/or bandwidth existing between any two nodes 18 is the same for all pairs of nodes 18. These networks are generally implemented by crossbar switches, multistage networks, or multicast networks such as Ethernet or token ring.

The topology transparent networks consist of nodes 18 configured as a clustering of computer processors. These multi-computer networks have the advantage that very little special software and hardware is required for their implementation and a great deal of readily available software and hardware is available for the implementation.

When processor clusters are used to implement high performance data servers, these clusters must allow for processor failures, or a single processor failure will cause the whole cluster to fail. If a processor in a cluster fails then tasks must not be assigned to that failed processor. A technique for monitoring the physical, logical identity, and operational state of processors within a cluster is commonly referred to as transmission of a heartbeat message.

U.S. Pat. No. 4,710,926 (Brown, et al.) describes fault recovery in a distributed processing system the heartbeat is broadcast among the processors once during each major processing cycle. The heartbeat message indicates the physical and logical identity of the transmitting processor with respect to the system arrangement as well as the processor's present operational state. By monitoring the heartbeats from other processors, spare processors can autonomously take over the functions of failed processors without being required to consult or obtain the approval of an executive processor. The new physical location of a replaced processor will be automatically recorded by the other processors.

In addition to the processor performance problems that have been discussed above, there are disk access performance issues as well and these issues become more important in multiple processor systems. There are two general performance issues. The first has to do with single thread disk access requests through a single processor and the second has to do with simultaneous request for data from a single file. In the case where the file system is read only, as in the case of video files, the solutions to these problems are not complicated by consistency issues.

In the first instance, if a file resides on a disk that is only accessible from a single processor complex, then requests for data from that disk is single threaded through a single processor complex. This can become a performance bottle neck. The solution to this problem involves allowing multiple processor connection to the disk controller. In this disk requests can be honored by any processor connected to the disk controller.

In the second instance, if multiple processors wish to read from the same file, then the read requests will be single threaded through the single disk on which the file resides. The solution to this problem involves the dividing of the file into physical segments that are stripped onto multiple physical volumes. This stripping of data is accomplished by the file system and is known to the file system and is different from the stripping that occurs in a RAID device. RAID devices can support this kind or file segmentation and are supported in the methods described in this application. When this is done, then multiple simultaneous requests for the same file can be supported, unless the same physical segment is requested. For files that are under heavy contention, multiple copies of segments can be created.

U.S. Pat. No. 6,014,669 (Slaughter, et al.) describes a highly-available distributed cluster configuration database. The cluster configuration database has a consistent copy of the configuration database maintained on each active node of the cluster. Each node in the cluster maintains its own copy of the configuration database and configuration database operations can be performed from any node. Configuration database updates are automatically propagated to each node in a lock-step manner. If any node experiences a failure, the configuration database uses a reconfiguration protocol to insure consistent data in each node of the cluster. The cluster configuration database uses a two-level consistency update framework to insure consistent data among the nodes. Each local configuration database uses a self-contained consistency record to uniquely identify and stamp each copy of the configuration database. The consistency of each individual copy of the configuration database can be verified from the consistency record. Additionally, the cluster configuration database uses a two-phase commit protocol to guarantee the copies of the configuration database are consistent among the nodes. Cluster operations may be performed from any node in the cluster. Cluster operations include restore, checkpoint, update, query, and consistency checking. Because each node maintains a local copy of the configuration database, configuration database queries are local operations and can be performed in parallel among the nodes. Update operations are global operations that involve each active node of the cluster. The cluster configuration database uses a global locking mechanism that implements single write/multiple reader semantics.

"XTP as a Transport Protocol for Distributed Parallel Processing," Strayer et al., Proceedings of the USENIX Symposium on High-Speed Networking, USENIX Assoc., August 1994, illustrates Xpress Transfer Protocol (XTP) as a flexible transport layer protocol designed to provide efficient service without dictating the communication paradigm or the delivery characteristics that qualify the paradigm. XTP provides the tools to build communication services appropriate to the application.

SUMMARY OF THE INVENTION

An object of this invention is to create a parallel processing system automatically formed of nodes of computer processing systems.

Another object of this invention is to create a parallel process system where each cluster has a cluster supervising processor or group leader system that controls cluster configuration, fault detection and isolation, and data distribution.

Further, another object of this invention is to provide a parallel processing system where clusters are reconfigured to allow removal and addition of nodes.

Still further, another object of this invention is to provide a parallel processing system which provides detection and isolation of failure of disk storage devices within a cluster.

Even still further, another of this invention is to provide a parallel processor system where nodes within a cluster are able to join or leave a cluster and not impact operation of the parallel processor system.

To accomplish at least one of these objects, a hierarchical clustered parallel processing system has at least one cluster of computer processing systems forming a node of a hierarchical cluster. Each cluster of computer processing systems includes multiple computer systems designated to be members of nodes of the cluster. A group of the member computer systems of the cluster may be configured as a sub-cluster, the sub-cluster being a node of the cluster. Each of the multiple computer systems is connected by a physical network to allow each computer system of the plurality of computer systems to transfer data between any of the plurality of computer systems.

Each cluster further has a virtual multicast bus and a configuration service apparatus. The virtual multicast bus is formed to provide communication between the member computer systems. The configuration service apparatus is in communication with each of the computer systems to provide each of the plurality of computer systems with a node identification, a multicast bus address, a node priority list, and a disk access list. The node identification identifies a node for each member computer system within the cluster. The multicast bus address identifies the virtual bus to broadcast communications to the members of the cluster by way of the virtual cluster bus. The node priority list designates a priority for each node within the cluster. The disk access list includes identification of accessible disks, disk mount points, and failure detection locations.

A cluster supervising processor provides operational control services for the cluster. The cluster supervising processor is selected from the member computer systems according to the priority from the priority list. The cluster supervising processor maintains a cluster topology table, a disk usage table, and a node usage table, and cluster map. The cluster topology table details connectivity for each node of the cluster and a disk access status for each disk within the cluster. The disk usage table describes current capacity and loading for each disk within the cluster. The node usage table describes a streaming capacity for each node of the cluster and a current loading for each node of the cluster. The cluster map describes network addresses for each of a plurality of servers in communication with the cluster and listing of nodes within the cluster, network addresses for the nodes, and an operational status of the nodes.

Each cluster of computer processing systems further has a fault detection apparatus within each member computer system. The fault detection apparatus periodically receives a first processor status message from a first adjacent node. The fault detection apparatus then appends a second processor status message of a current node to the first processor status message. Then, the fault detection apparatus periodically transmits the first and second processor status message to a second adjacent node. The cluster supervising processor then receives an accumulation of the processor status messages from all nodes of the cluster. If the fault detection apparatus does not receive the first processor status message for a number of periods (for instance 5 periods), the first adjacent node is declared to have failed and a failure declaration is appended to the second processor status message. Upon receipt of the failure declaration, the cluster supervising processor modifies the cluster map to reflect failure of the node.

The cluster supervising processor periodically posts a supervisor notification message on the virtual multicast bus, the supervisor notification message comprises a node identification and a network address for the cluster supervising processor, the cluster topology, and a current cluster map. If one node of the cluster does not receive the supervisor notification message within a notification time, the node becomes the cluster supervising processor, updates the cluster topology table and the cluster map, transmits a cluster supervising processor update message, and the supervisor notification message.

Each node of the cluster periodically determines whether each disk to which the node has access is functioning. If any disk is not functioning, the node creates a disk failure message for the disk not functioning for transfer to an adjacent node. The adjacent node transfers the disk failure node to subsequent adjacent nodes until the cluster supervising processor receives the disk failure message. Upon receipt of multiple disk failure messages from multiple nodes for the disk not functioning, the cluster supervising processor declares a disk failure, updates the disk usage table, and reassigns all the transfer of video data files from a failing node to an active node.

A new node is added to or joins the cluster by first listening to the virtual multicast bus for a supervisor notification message from the present cluster supervising processor. Once the supervisor notification message is received, a join request message providing a node identification, a network address for the node, and a disk access list for the node is posted on the virtual multicast bus. The present cluster supervising processor updates the cluster map and the cluster topology to reflect the addition and joining of the new node. A new supervisor notification message is transmitted on the virtual multicast bus including the new node. The new node ceases posting on the virtual multicast bus the join request message.

If the new node has a priority that supercedes the present cluster supervising processor, the new node becomes the cluster supervising processor, if. The new node now acting as the present cluster supervising processor transmits the supervisor notification message and the original cluster supervising processor ceases transmitting the supervisor notification message. Alternately, if the new node does not transmit the supervisor notification message by the notification time, the original cluster supervising processor assumes that the new node has failed and resumes transmission of the supervisor notification message.

A node is removed or leaves a cluster by first posting a leave message on the virtual multicast bus. The leave message contains the node identification and the network address for the node. The cluster supervising processor updates the cluster map and the cluster topology. The cluster supervising processor then posts the supervisor notification message with the updated cluster map and cluster topology on the virtual multicast bus. The node leaving the cluster ceases posting the leave message upon receipt of the supervisor notification message with the updated cluster map and cluster topology. If the node leaving the cluster is the cluster supervising processor, the node of the cluster designated by the priority list then becomes the cluster supervising processor.

A cluster is formed and the cluster supervising processor is designated by each node of the cluster listening to the virtual multicast bus for a supervisor notification message from the cluster supervising processor. If no supervisor notification message is received, each node designates itself as a single node cluster of its own. Each node the cluster is designated as supervising processor of its single node cluster. Each cluster supervising processor of each single node cluster transmits the supervisor notification message for each single node cluster. Those nodes having a lower priority cease transmitting supervisor notification messages such that the node with a highest priority is the cluster supervising processor. The nodes of the cluster then post a join request on the virtual multicast bus. The join request message provides a node identification, a network address for the node, and a disk access list for the node.

BRIEF DESCRIPTION OF THE DRAWINGS

FIG. 1 is a block diagram of a uniprocessor computing system expanded to become a symmetric multiprocessor computing system of the prior art.

FIG. 2 is a block diagram of a cluster of network connected computer processing systems having a shared DASD pool of the prior art.

FIG. 3 is a block diagram of a cluster of network connected computing systems of the prior art.

FIG. 12 is a flowchart of a method for organization of a distributed parallel computer processing system of this invention.

FIG. 13 is a flowchart of the method for defining clusters of a distributed parallel computer processing system of this invention.

FIG. 14 is a flowchart of the method for establishing a group leader hierarchy within a cluster of a distributed parallel computer processing system of this invention.

FIG. 15 is a flowchart of the method for providing configuration of clusters of a distributed parallel computer processing system of this invention.

DETAILED DESCRIPTION OF THE INVENTION

Figure 5:
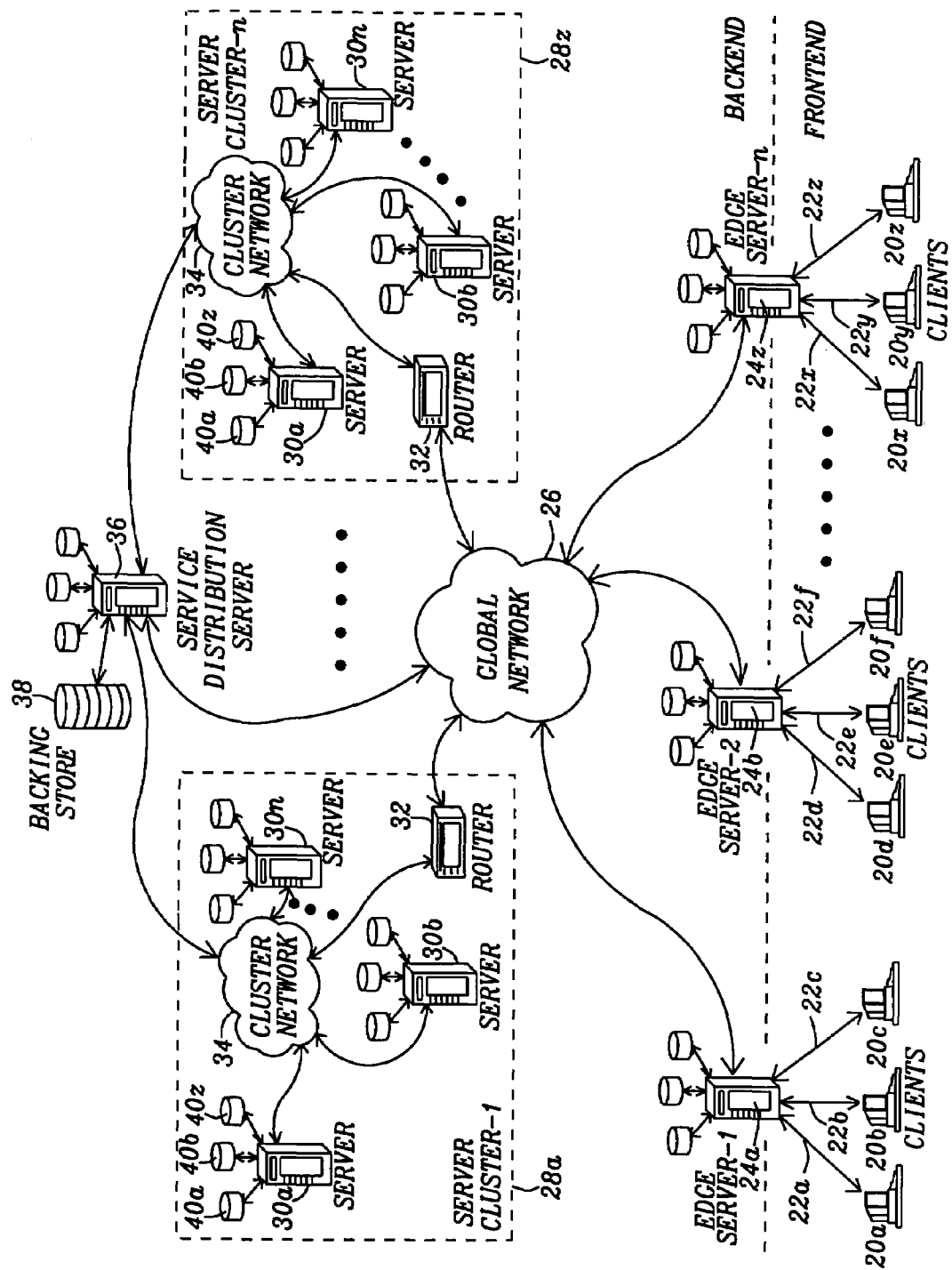
FIG. 5 is a diagram of hierarchical cluster of server computing systems of this invention.

Refer now to FIG. 5 for a description of a video distribution system created to operate on a hierarchical clustered parallel processing system formed of clusters $28a, \ldots, 28z$ of networked computing systems. The client computing systems $20a, \ldots, 20z$ are connected through a communications link $22a, \ldots, 22z$ to an edge servers $24a, \ldots, 24z$. Each edge server $24a, \ldots, 24z$ acts as an interface for the client computing systems $20a, \ldots, 20z$ to a global communications network 26. The edge servers $24a, \ldots, 24z$ are at the boundary between the "front-end" and the "back-end" of the video distribution system. The front-end being the client computing systems $20a, \ldots, 20z$ that are the terminal points whereby the users can access the video distribution system. Further, the edge servers $24a, \ldots, 24z$ are generally Internet service providers to which the client computing systems $20a, \ldots, 20z$ are in communication.

The backend of the video distribution system has server systems $30a, \ldots, 30z$ that are grouped together to form server clusters $28a, \ldots, 28z$. The server systems $30a, \ldots, 30z$ are interconnected together through the cluster network 34. A router 32 provides an interface for the server clusters $28a, \ldots, 28z$ to the global communication network 26. Each of the server systems $30a, \ldots, 30z$ has multiple disk storage devices $40a, \ldots, 40z$. The multiple disk storage devices $40a, \ldots, 40z$ may be individual disks connected to the memory bus of the server system as shown in FIG. 1 or a storage area array connected through a disk network as shown in FIG. 2.

The disks as shown in FIG. 2 may configured as a redundant array of independent disks (RAID). RAID is a way of storing the same data in different places (thus, redundantly) on multiple hard disks. By placing data on multiple disks, input/output operations can overlap in a balanced way, improving performance. Since multiple disks increase the mean time between failure (MTBF), storing data redundantly also increases fault-tolerance.

A service distribution server 36 provides the central gateway, content distribution, billing, hierarchical clustered parallel processing system configuration, admission, and title services. A backing store 38 is in communication with and controlled by the service distribution server to maintain a central repository of all video content to be distributed by the video distribution system through the hierarchical clustered parallel processing system. Each of the clusters $28a, \ldots, 28z$ of networked computing systems $30a, \ldots, 30z$ will have a cluster supervising processor or group leader that will locally provide the gateway, content distribution, billing, hierarchical clustered parallel processing system configuration, admission, and title services.

The group leader of the clusters $28a, \ldots, 28z$ of networked computing systems $30a, \ldots, 30z$ or the service distribution server 36 provides gateway service and is the central point of contact for incoming requests to the system from the client computing systems $20a, \ldots, 20z$. When one of the client computing systems $20a, \ldots, 20z$ requests a video data file (on demand) or to join a broadcast (multicast) of a video data file, it first contacts the gateway service of the group leader of the clusters $28a, \ldots, 28z$ of networked computing systems $30a, \ldots, 30z$ or the service distribution server 36. The gateway service maintains an updated list of the server systems $30a, \ldots, 30z$ in the system. Based on the location of the client computing system $20a, \ldots, 20z$ and the type of request, it routes the request to the appropriate server systems $30a, \ldots, 30z$.

A large-scale system containing thousands of video data files must offer an efficient and easy to use content management service to the client computing systems. The group leader of the clusters $28a, \ldots, 28z$ of networked computing systems $30a, \ldots, 30z$ or the service distribution server 36 provides the title service to perform the content management service. The content management service includes capabilities to add/delete, categorize, and browse video data files. Client computing systems $20a, \ldots, 20z$ then, browse video data files controlled by the gateway service.

In a video distribution system of this invention that is geographically distributed and employs broadband communications, there will be multiple group leader of the clusters $28a, \ldots, 28z$ of networked computing systems $30a, \ldots, 30z$ or the service distribution server 36 providing the title service for a service region covered by the video distribution system. The group leader of the clusters $28a, \ldots, 28z$ of networked computing systems $30a, \ldots, 30z$ or the service distribution server 36 providing the gateway service will route the client computing systems $20a, \ldots, 20z$ requests to appropriate group leader of the clusters $28a, \ldots, 28z$ of networked computing systems $30a, \ldots, 30z$ or the service distribution server 36 to provide the title service based on the location of the client computing systems.

The distribution service is used to introduce new contents in the video distribution system of this invention. Once a new video data file is available, a media distributor uses this service to propagate the title to different service regions of a geographically distributed system. The distribution server consists of four distinct components. A distribution center, which is a remote service, is used by media distributors or internet content providers to push new video data files to regional server systems. A distributor console, a web based remote graphical user interface (GUI), is used to specify locations and contents to be pushed to remote server systems. A set of asset managers, which are local to regional server systems, is responsible for managing and tracking contents in the regional server systems $30a \ldots, 30z$. A set of asset databases, one database per regional server system $30a, \ldots, 30z$, which stores the meta data for the available contents (video data files) in those regional server systems $30a, \ldots, 30z$. Asset managers use this database to keep track of local video data files. Multiple asset managers can share one asset database. The title service from the group leader of the clusters $28a, \ldots, 28z$ of networked computing systems $30a, \ldots, 30z$ or the service distribution server 36 also uses this database to generate a categorized, browsable list of video data files.

A media distributor uses the distributor console to schedule distribution of new media data objects (video data files) to the video distribution system of this invention. The new video data files generally reside in a tertiary or backing storage 38 such as a robotic DVD on the service distribution server 36. The media distributor specifies when to push the title, the list of target regional sites, and the textual meta data related to the video. Among other things, the meta data of a title will possibly contain information required to categorize it, as well as, a set of searchable strings that can be used to search the content of the video data files. The distributor console connects with the service distribution server 36 to delivers the scheduled content. The distributor console contacts the asset managers in the specified target server systems $30a, \ldots, 30z$ and schedules the delivery of the new content. Once a server system $30a, \ldots, 30z$ receives the new video data file, it first stores the content in any available space in a local disk $40a, \ldots, 40z$. Then, it updates the asset database with the information on the new video data file (including the received meta data on the video data file). If it does not have any available space, it replaces an old video data file using a programmed policy.

Based on the client computing systems $20a, \ldots, 20z$ request (browsing by category, or searching using a string), the group leader of the clusters $28a, \ldots, 28z$ of networked computing systems $30a, \ldots, 30z$ or the service distribution server 36 through the title service queries the asset database, and creates a list of video data files for the client computing systems $20a, \ldots, 20z$ to browse. The title service uses aggressive caching techniques to improve the performance of the query. When new information is added in the asset database, the cache associated with the title service is invalidated.

It is sometimes possible for a database of the title service to have information on a video data file, which is not wholly available in the local disk storage devices $40a, \ldots, 40z$ of networked computing systems $30a, \ldots, 30z$ for various reasons. Portions of the video data file may have been replaced because the asset manager needed space for a new video data file, or only a portion of a video data file was propagated from the service distribution server 36. Once a client computing systems $20a, \ldots, 20z$ requests such a video data file, the server system $30a, \ldots, 30z$ fetches the video data file to the local disk storage devices $40a, \ldots, 40z$. The server system $30a, \ldots, 30z$ allocates free space in the local disk storage devices $40a, \ldots, 40z$, possibly by replacing a portion of a resident video data file. The server system $30a, \ldots, 30z$ contacts the service distribution server 36 providing the name of the video data file and the remaining portion of the video data file. Once the service distribution server 36 is ready, the server system $30a, \ldots, 30z$ fetches the remaining portion of the video data file, stores it in the allocated free space, and updates the asset database.

Once user of a client computing systems $20a, \ldots, 20z$ selects a video data file to be viewed, it contacts the group leader of the clusters $28a, \ldots, 28z$ of networked computing systems $30a, \ldots, 30z$ or the service distribution server 36 that provides admission service. The admission service is based on the bandwidth requirements and the file location of the video data file, assigns a video server system $30a, \ldots, 30z$ from the server clusters $28a, \ldots, 28z$.

The admission service provides a set of mechanisms, which are used to implement different policies for load balancing. The admission service maintains a cluster topology, a disk usage table, a node usage table, and a cluster map. The cluster topology maintains the connection information of the cluster $28a, \ldots, 28z$. It itemizes a list of server systems $30a, \ldots, 30z$ of a server cluster $28a, \ldots, 28z$, which can access any of the local disk storage devices $40a, \ldots, 40z$. The cluster topology contains the server system identification that is the mount point where a disk is mounted, and the access status of the disk.

The disk usage table maintains the capacity (maximum data rate in Mbps) and the current load (data rate in Mbps) for each disk in the server cluster $28a, \ldots, 28z$. The node usage table maintains the streaming capacity (maximum data rate in Mbps) and the current load for each node in the server cluster. The cluster map maintains an up to date list of network address (internet protocol address), port and the status of the important server systems $30a, \ldots, 30z$ in the distribution system, and it maintains a list of server systems $30a, \ldots, 30z$ in the cluster their network addresses and their status. A server system $30a, \ldots, 30z$ can be in one of two states: Active or Live (L) and Failed or Dead (D). Additionally, the admission service maintains a supporting data structure, required to provide fault tolerance and authenticated access to the server cluster $28a, \ldots, 28z$. The data structure maintains a table containing the list of active sessions per server system $30a, \ldots, 30z$ and a similar table for active sessions per disk $40a, \ldots, 40z$.

The configuration service allows an administrator to define and to configure server clusters $28a, \ldots, 28z$ of the distributed server installations. It maintains an up-to-date information of the distributed installation using a periodic monitoring mechanism and asynchronous update events from the servers $30a, \ldots, 30z$ in the hierarchical clustered parallel processing system.

The video data files may be several gigabytes in size. In order to facilitate the transfer of the video data files to client computing systems for viewing by a user, it is desirable to fragment the video data file into smaller segments. Each segment is assigned a file name and a location within any of the disks. When a client computing system requests a video data file, the admission server retrieves the listing of the segments of the requested data file from the disk usage table. It should be noted, that the requested video data file might in fact be any portion of a larger video data file not just the whole video data file. It should further be noted that the portion of the video data file requested might not encompass whole segments by might also contain fractional segments.

The group leader of the clusters $28a, \ldots, 28z$ of networked computing systems $30a, \ldots, 30z$ or the service distribution server 36 provide a billing service that communicates with the admission service. The billing service acts a financial clearinghouse to allow access of the client computing systems to the video distribution system of this invention. The admission service, upon the request for a video, sends a billing request to the billing service. The billing request contains the identification of the video file requested, the necessary financial and accounting information from the user of the client computing system $20a, \ldots, 20z$.

Figure 4A:
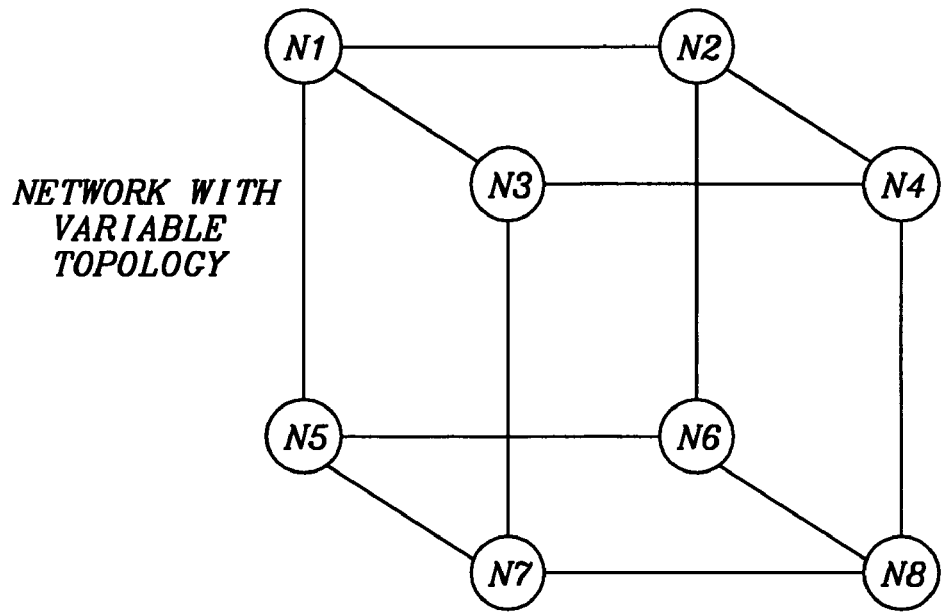
FIGS. 4a and 4b are an illustration of network topology of parallel processing systems of the prior art.
Figure 4B:
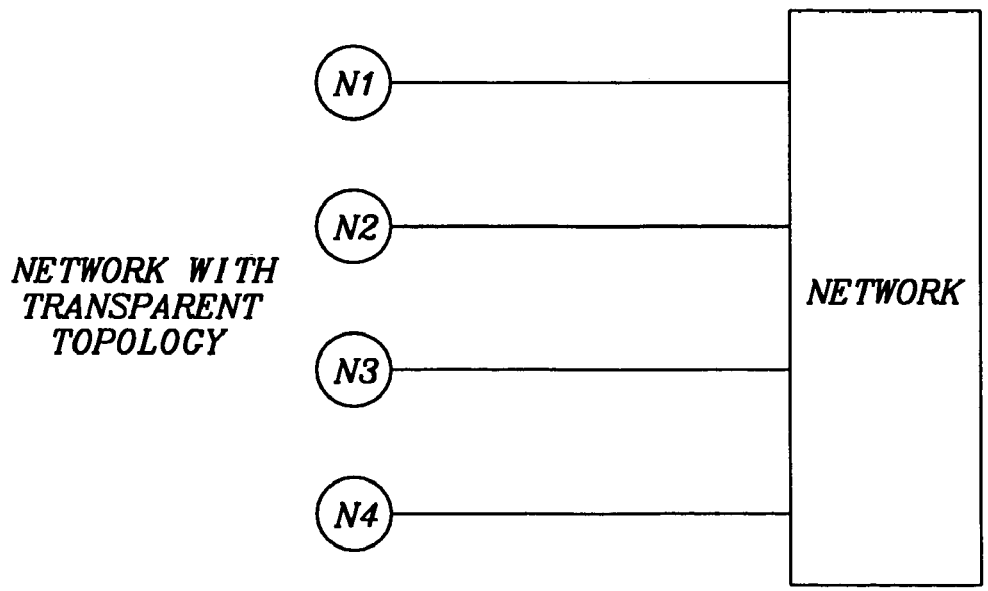

In a network, the neighbors of a node are those nodes that are "directly" connected to the node, as shown in FIG. 4a. But in a broader definition a node's neighbors might be those that the given node can communicate with. In the simplest case each node would have a list of nodes and those on the list would be nodes with which the given node could communicate. It there is no routing information associated with the data structure that defines the node neighborhood, then the virtual network must be a sub-network of the physical network. But if routing information is included in the neighborhood definition then any set of nodes can be in a given node's neighborhood. The sorts of information that might be contained in the data structure that defines the neighborhood would be:

Communicate with this (these) node(s) preferentially (weighted preference).
Communicate with this (these) node(s) under these circumstances.
Communicate with this (these) node(s) for this type of information.
Do not communicate with this (these) node(s) (because they have died).
Start communicating with this (these) node(s) (because they have joined the neighborhood).

Computer clusters are commonly connected to multicast networks such as the internet. Such networks provide a kind of "any-to-any" connectivity. While it is true that nodes on such a network may not all be equidistant in terms of communications overhead between all pairs of nodes, the network is thought of as having "any-to-any" connectivity as a first order approximation. This has the advantage of allowing any two nodes to appear to communicate directly and any task may be mapped to any node without regard to its communication patterns.

Figure 6:
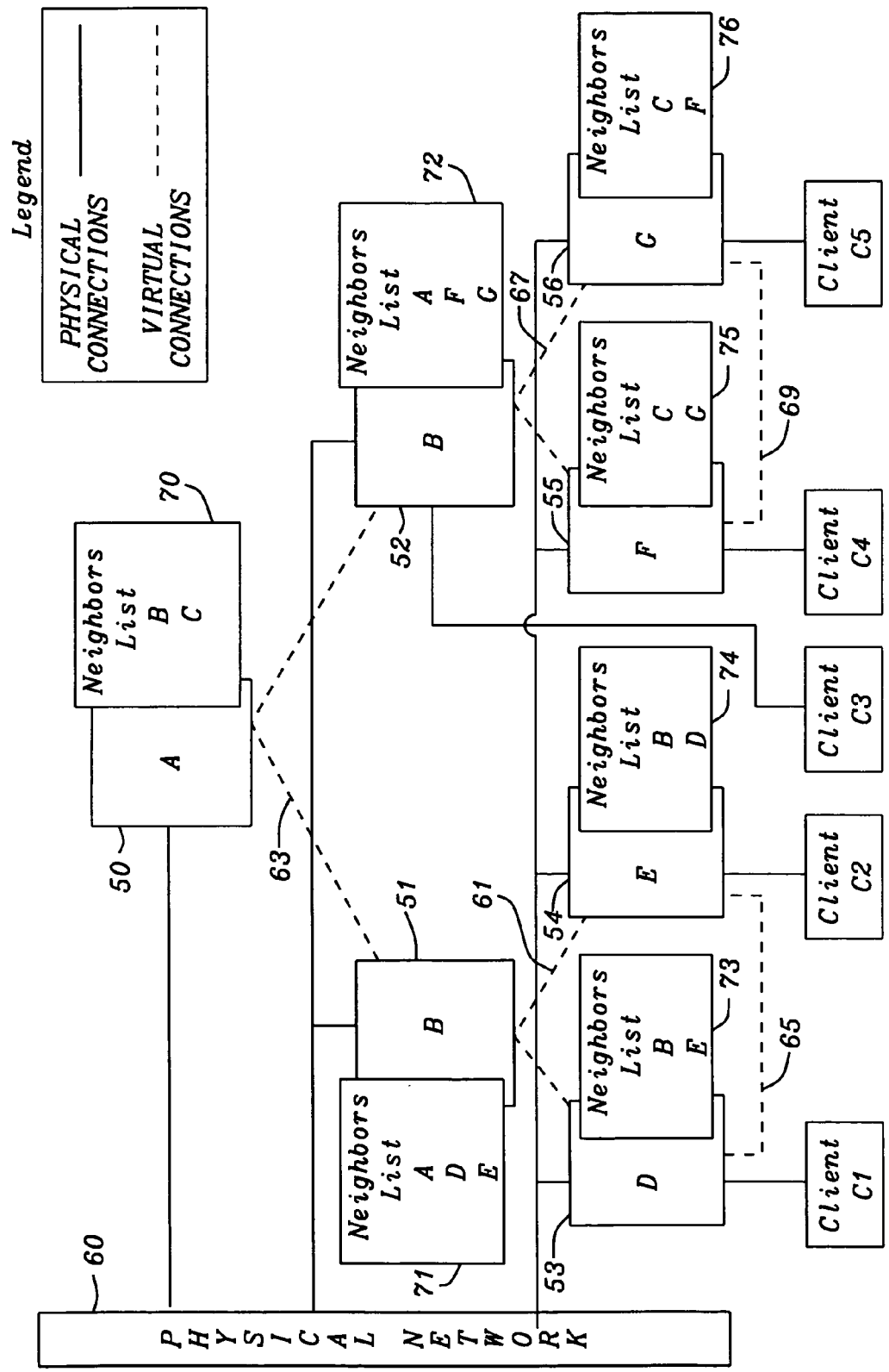
FIG. 6 is a diagram of physical and virtual network connections of clustered computing systems of this invention.

Despite the advantages of the above "any-to-any" networks, it is sometimes convenient to define a virtual network topology over the existing physical network topology. One example of such a case would be if certain nodes required resources available only on some subset of nodes and the nodes serving those resources needed to restrict the number of clients that could access them for performance reasons. In this case a hierarchical network is defined. FIG. 6 illustrates a binary tree implementation using such a hierarchical network. Referring to the FIG. 6, all the nodes 50, . . . , 56 are connected to each other via some multicast network 60 (for example an Ethernet using an IP communications protocol). In addition, each node 50, . . . , 56 contains a data structure called a neighbor's list 70, . . . , 76 that defines the virtual networks 62, . . . , and 69. Each node 50, . . . , 56 of the virtual network 61, . . . , 69 is on the neighbor's list 70, . . . , 76 of the nodes 50, . . . , 56. For instance, the list 70, . . . , 76 details the nodes 51, 53, and 54 of the virtual network 61 with which the node 51, 53, and 54 can communicate. So, for example, node B 51 can go up the tree to node A 50 for the service associated with the virtual network 63 as shown on the neighbor's list 71 that node B 51 maintains and node B 51 can expect resource requests from nodes D 53 and E 54 as members of the virtual network 61. The FIG. 6 also depicts an optimization that allows the edge nodes to communicate directly. This would be useful if, for example, node E 54 had already acquired a resource from node B 51 and subsequently node D 53 also needed that resource. In this case D 53 could request the resource from E 54, thereby lowering the demand on B 51. This effectively creates a virtual sub-network 65 of the nodes D 53 and E 54. It should be noted that an important feature of this scheme is that multiple neighbor's lists 70, . . . , 76 may be held by the nodes 50, . . . , 56 in the network so that for different purposes multiple virtual networks 62, . . . , 69 could exist simultaneously.

Figure 7:
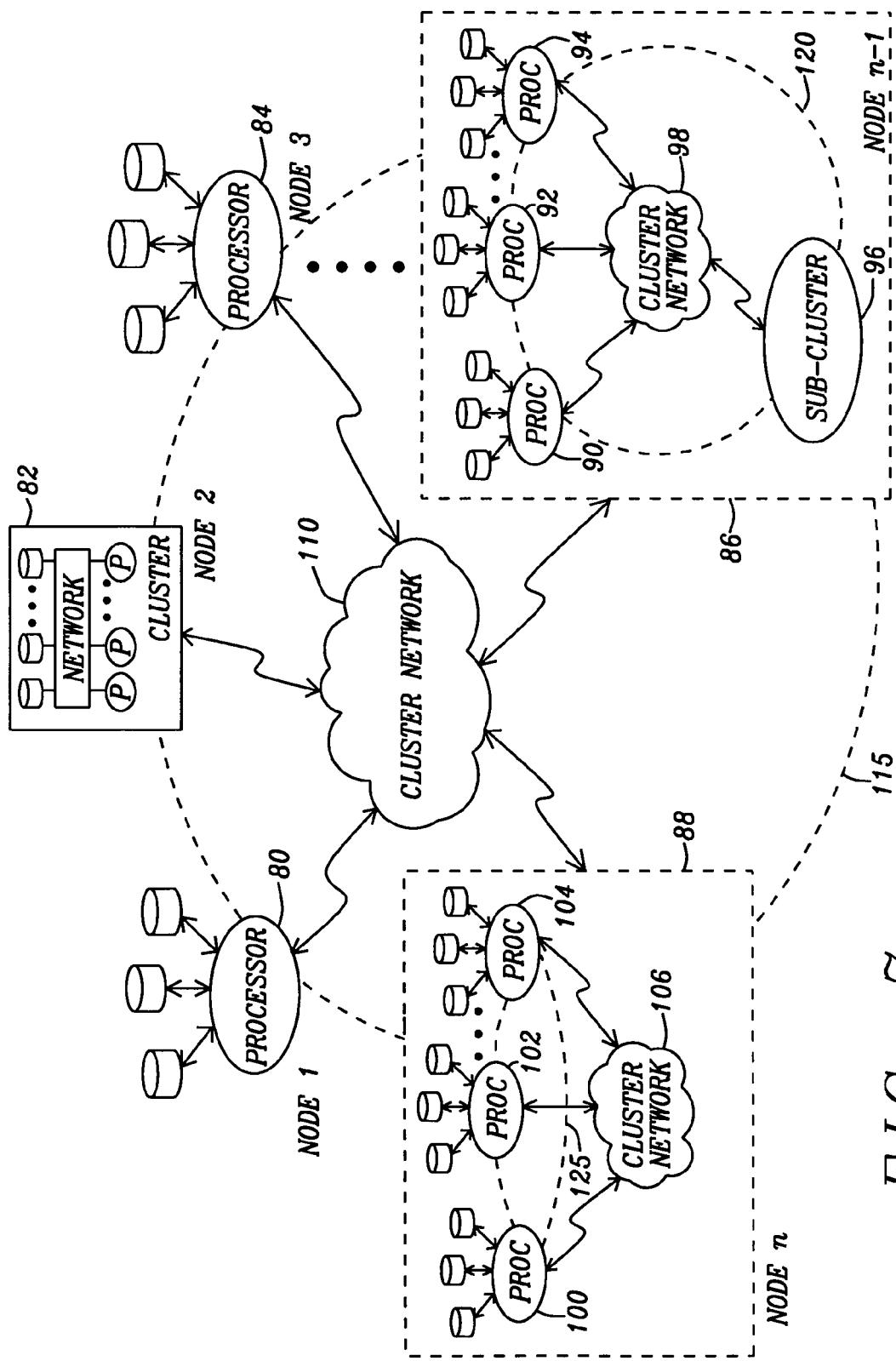
FIG. 7 is a diagram of virtual network connections of clustered computing systems of this invention.

Returning to FIG. 5, when a hierarchy of servers 24a, . . . , 24z and 30a, 30z is used to serve clients 20a, . . . , 20z, the clients 20a, . . . , 20z are connected to the edge servers of the hierarchy. However, if the hierarchy of servers 24a, . . . , 24z and 30a, . . . , 30z exists to define the relationships of resource sharing among the servers 24a, . . . , 24z and 30a, . . . , 30z, then it could be that clients 20a, . . . , 20z might connect to servers 24a, . . . , 24z and 30a, . . . , 30z anywhere in the hierarchy. In this case a virtual edge is created and all those nodes that are servicing clients 20a, . . . , 20z directly are considered to be edge nodes 24a, . . . , 24z. The definition of the edge server 24a, . . . , 24z could be contained in an access server that all clients connect to in order to gain access to the network. The access server would then assign the client 20a, . . . , 20z to an available edge server 24a, . . . , 24z. This assignment could be based on a number of factors including, physical location of the client 20a, . . . , 20z, load on the servers 24a, 24z and 30a, . . . , 30z, and this type of request being made by the client 20a, . . . , 20z. FIG. 7 shows the structure of the topology that can be created by using the clusters as defined.

FIG. 7 illustrates the formation the cluster structure having the virtual networks described above. A group of processors 80, 82, and 84 and/or sub-networks of processors 86 and 88 are connected physically to a cluster network as described above. Each of the processors 80, 82, and 84 and/or sub-networks of processors 86 and 88 have a neighbor's listing defining them as members of the cluster and virtually connected by the cluster network 110. The sub-networks of processors 86 and 88 are formed of groups of processors 90, 92, and 94 and processors 100, 102, and 104 that are connected by the cluster networks 98 and 106. The sub-networks of processors 86 further has a sub-network or sub-cluster 96 embedded within the sub-network. Each of the processors 90, 92, and 94 and processors 100, 102, and 104 and the sub-cluster 96 have neighbor's list defining them as members of their respective sub-networks or sub-cluster of processors 86 and 88. These neighbor's lists thus define the virtual cluster network or cluster buses 98, 106, and 110 that allows essentially direct and shared communication with the member processors 80, 82, and 84 and/or sub-cluster of processors 86 and 88. Further, the neighbor's list as defined allow for definition of second network or command ring 105, 115, and 120 for the cluster of processors 80, 82, and 84 and/or sub-cluster of processors 86 and 88. The cluster bus for transferring commands, data, and processor status messages commonly referred to as heartbeat messages or command beat messages for maintaining reliability of the network between the processors 80, 82, and 84 and/or sub-clusters of processors 86 and 88. The optional command ring 105, 115, and 120 may be implemented to transfer of processor status messages (heartbeat messages or command beat messages) for maintaining reliability of the network.

Figure 8:
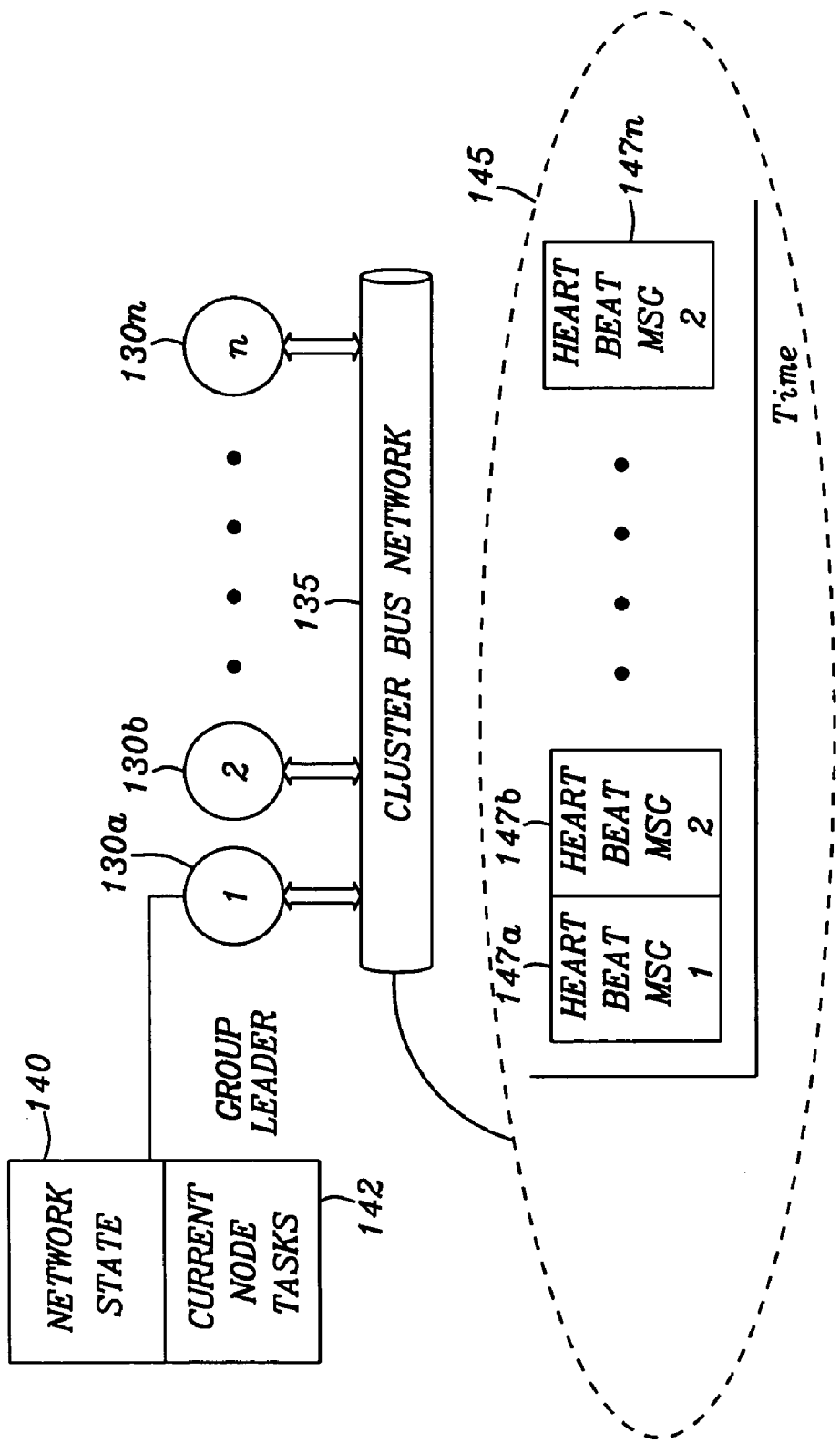
FIG. 8 is a diagram illustrating the passing of a heartbeat message in a multi-cast bus of a distributed parallel computer processing system of this invention.

Refer to FIG. 8 for a description of a virtual multicast bus or cluster bus of the hierarchical clustered parallel processing system of this invention. Each node 130a, . . . , 130n of the hierarchical clustered parallel processing system is a single computer system or a sub-cluster or sub-network of computer systems as described above. The nodes 130a, . . . , 130n are connected physically as described in FIG. 6 with the cluster bus being described in the neighbor's list of FIG. 6 maintained by each computer. The cluster bus network 135 is the virtual connectivity that is effectively implemented by the neighbor's list. One of the nodes 130a is given a priority that designates it as the group leader. The cluster supervising processor or group leader 130a maintains the network state 140 and the current node task listing 142. The network state 140 provides a cluster topology table and a cluster map. The cluster topology table and the cluster map act as a master version of the neighbor's listing. The cluster topology table details connectivity for each node of the cluster and a disk access status for each disk within the cluster. The cluster map describes network addresses for each of a group of servers in communication with the cluster and listing of nodes within the cluster, network addresses for the nodes, and an operational status of the nodes. The current node task listing 142 contains a disk usage table and a node usage table. The disk usage table describes current capacity and loading for each disk within the cluster. The node usage table describes a streaming capacity for each node of the cluster and a current loading for each node of the cluster.

The heartbeat messages or command beat messages for maintaining reliability of the network in the preferred embodiment of the hierarchical clustered parallel processing system of this invention are transmitted on the cluster bus network 135. The cluster bus network 135 is assigned a multicast bus address that is used by each of the nodes 130*a*, . . . , 130*n* to recognize data being broadcast to the nodes 130*a*, . . . , 130*n*. In the preferred embodiment the multicast bus address is an internet protocol (IP) address that is recognized by each of the nodes 130*a*, . . . , 130*n*. In the physical structure and the virtual structure of the cluster network 135, the heartbeat message 145 for each of the nodes 130*a*, . . . , 130*n* is assigned a time slot 147*a*, . . . , 147*n* for broadcast on the cluster bus network 135. Each time slot 147*a*, . . . , 147*n* contains the heartbeat message for each node 130*a*, . . . , 130*n* connected to the cluster bus network 135.

Figure 9:
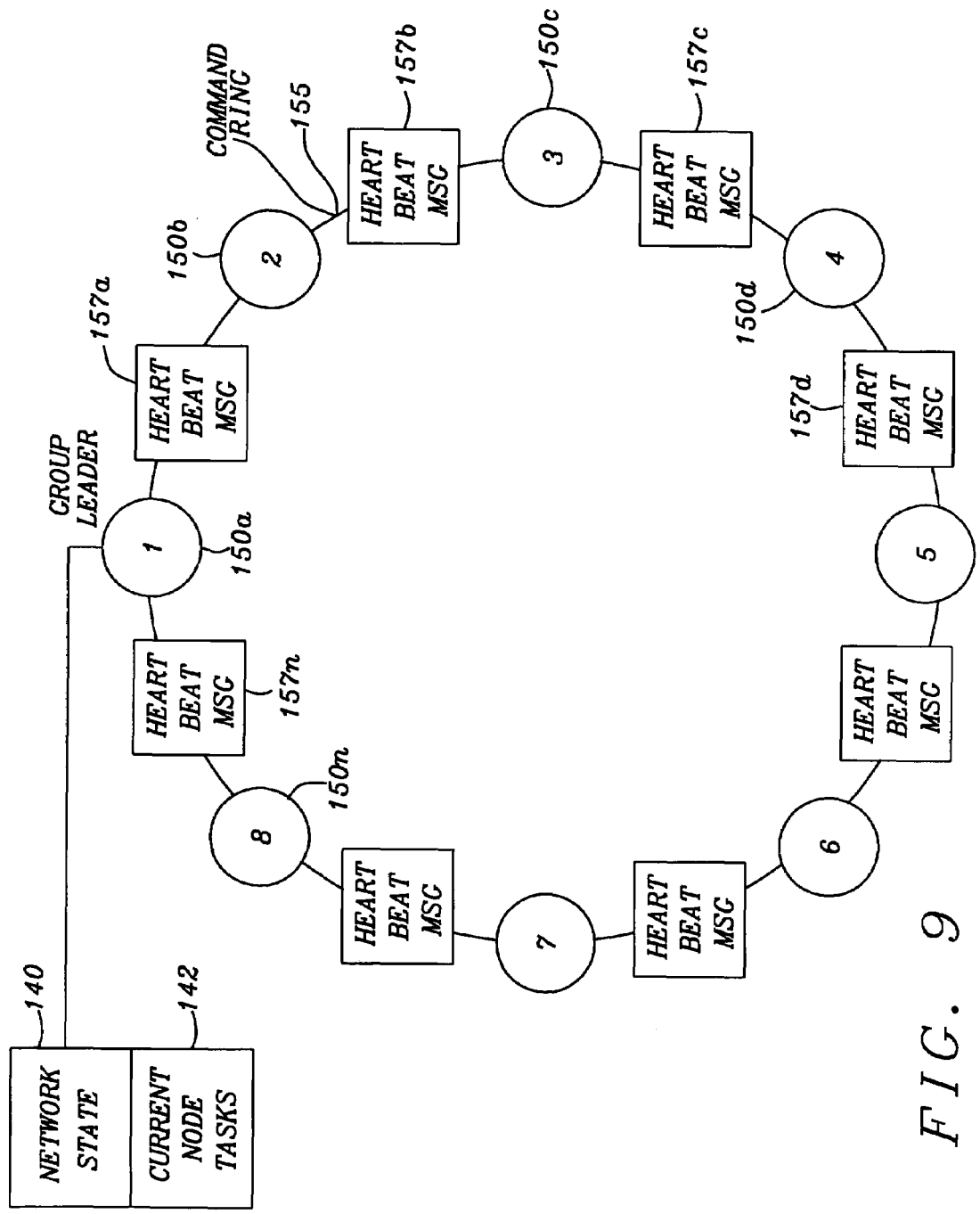
FIG. 9 is a diagram illustrating the passing of a heartbeat message in a virtual command ring of a distributed parallel computer processing system of this invention.

Referring now to FIG. 9 for a description of the virtual command ring structure. Each node 150*a*, . . . , 150*n* of the hierarchical clustered parallel processing system is a single computer system or a sub-cluster or sub-network of computer systems as described above. The nodes 150*a*, . . . , 150*n* are connected physically as described in FIG. 6 with the command ring network 155 being described in the neighbor's list of FIG. 6 maintained by each computer. The command ring network 155 is the virtual connectivity that is effectively implemented by the neighbor's list. One of the nodes 130*a* is given a priority that designates it as the group leader. The cluster supervising processor or group leader 130*a* maintains the network state 140 and the current node task listing 142. The network state 140 provides a cluster topology table and a cluster map. The cluster topology table and the cluster map act as a master version of the neighbor's listing. The cluster topology table details connectivity for each node of the cluster and a disk access status for each disk within the cluster. The cluster map describes network addresses for each of a group of servers in communication with the cluster and listing of nodes within the cluster, network addresses for the nodes, and an operational status of the nodes. The current node task listing 142 contains a disk usage table and a node usage table. The disk usage table describes current capacity and loading for each disk within the cluster. The node usage table describes a streaming capacity for each node of the cluster and a current loading for each node of the cluster.

The heartbeat messages or command beat messages for maintaining reliability of the network in a second embodiment of the hierarchical clustered parallel processing system of this invention are transmitted on the command ring network 155. The heartbeat message 145 for each of the nodes 150*a*, . . . , 150*n* is transmitted serially and periodically on the command ring network 155. Each node 150*a*, . . . , 150*n* receives the heartbeat message from its neighbor according to a priority detailed within the network state 140. The state of each node 150*a*, . . . , 150*n* is appended to the heartbeat message from an adjacent node and passed to the next node according to the priority from the network state 140. The group leader receives the heartbeat message from the node 130*n* which has the next priority of the network. This heartbeat message containing the processor and disk status for all the nodes 150*a*, . . . , 150*n* in the network.

Figures 10A, 10B:
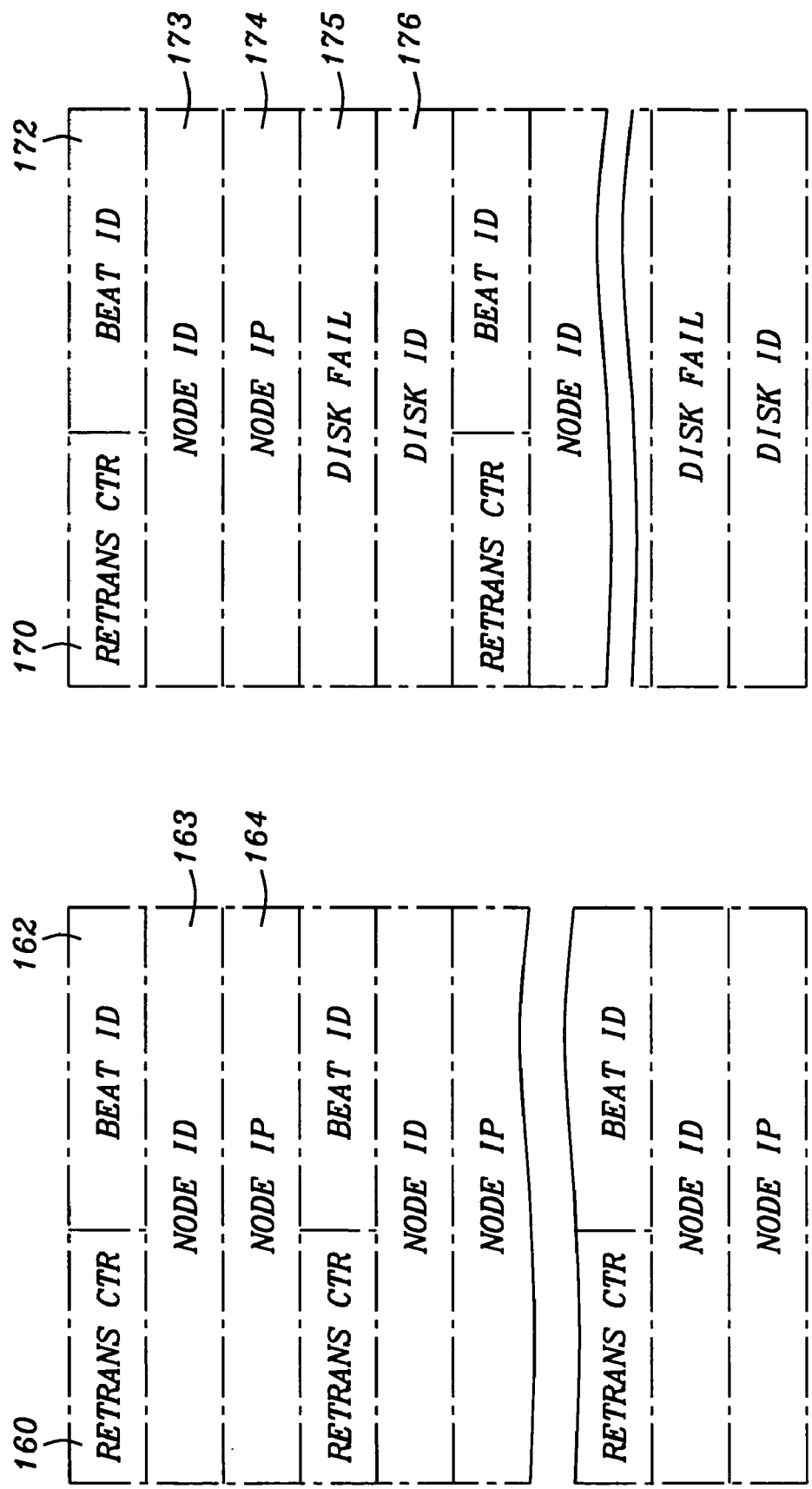
FIGS. 10a and 10b are illustrations of the heartbeat and command beat protocol structure of this invention.

The heartbeat messages of FIGS. 8 and 9 are structured as shown in FIGS. 10*a* and 10*b*. With the command ring network 155 embodiment of the hierarchical clustered parallel processing system of this invention, each node appends its own heartbeat message to the incoming heartbeat message from an virtually adjacent neighbor and transfers it to it to a second virtually adjacent neighbor according to the priority for each of nodes. The Heartbeat message uses a User Datagram Protocol (UDP) which is an unreliable protocol. However, the heartbeat messages are repeated sufficiently often such that the heartbeat messages create a very reliable technique for controlling the structure of the hierarchical clustered parallel processing system of this invention.

The heartbeat messages of FIG. 10*a* contain a retransmission counter 160 providing a number of heartbeat messages that have been issued. A heartbeat identification 162 provides an effective timestamp for the heartbeat messages such that the ordering of the heartbeat messages is maintained even though some of the messages are lost due to the unreliability of the protocol. The node identification designation 163 for the node is attached followed by the network address (Node IP) 164 of the node. In the cluster bus network of FIG. 8, the messages are placed on the cluster bus network in the designated time slots. In the command ring network of FIG. 9, the each node receives the heartbeat message from an adjacent node and appends its heartbeat message to the received heartbeat message and transmits the heartbeat message to a subsequent adjacent node.

Periodically, each processor within a cluster or sub-cluster of processors transmits a request to each disk storage device which the processor has access to determine the status of the disk storage device. In some instances, a disk controller monitors the operational status of the disk and transmits a message indicating the operational status. In other instances, the processor designates a location on the disk as operational status monitor location that is isolated from the operational and program data retained by the disk storage device. The processor writes a status word to each disk storage device to which the processor has access and read the status work from the location. The success of the write followed by the read determines the operational status of the disk.

If a disk has failed, the processor sends a command beat message either on the cluster bus network of FIG. 8 or on the command ring of FIG. 9 declaring the failure of the disk. The message, as shown in FIG. 10*b*, has a retransmit counter 170 providing the number of time the command beat message is retransmitted. The beat identification 172 providing a timestamp for the message such that if the message is lost or the messages are received out of order they are interpreted correctly. The node identification 173 of the node within the cluster and the node network address (IP address) 174 are the added to the message. A message declaring a disk failure 175 and the disk identification 176 provides the location of the failed disk. Upon receipt of multiple disk failure messages from multiple nodes for the disk not functioning, the group leader declares a disk failure and updates the disk usage table and institutes appropriate failure handling routines.

When a node fault is detected, all the transfer of video data files from a failing node is reassigned to an active or "live" node. The active node can access the video files based on the disk usage table that describes which node can access which disk). Since the group leader provides the admission services, it knows which transfer of the video data files is assigned to which node. It also periodically collects states of the transfer of the video data files from these nodes and possibly, from the client systems. It uses the "last known" state to re-establish the transfer of the video data files in a new node.

On disk failure, the group leader will act similarly. There can be several types of response as shown:

1. If a single disk fails in a RAID system, the RAID system, if configured right, will still continue to work. However, the throughput may downgrade. In this case, a number of transfers of video data files that will be reassigned to a "live" node to lower the throughput of the current node. Plus, an alarm will be generated for the operator.

2. If the whole RAID system fails, it treats it as a node failure. The group leader of the cluster system finds another node which can access a copy of the video segments (if another copy does not exist, it will initiate a caching operation to bring in the segments) and fail the streams over to the new node.

Upon completion of the handling of the failure, the group leader transmits its own heartbeat to the service distribution server. The heartbeat contains the updated cluster map, the disk usage table and the node usage table to provide the status of the cluster after the failure.

As noted above, a cluster can include other sub-clusters. Each sub-cluster has a group leader, which maintains a table indicating the functioning of the nodes of the cluster. The group leader of a sub-cluster transfers node status to the group leader of the cluster containing the collective status from the heartbeat messages of the sub-cluster.

Figure 11:
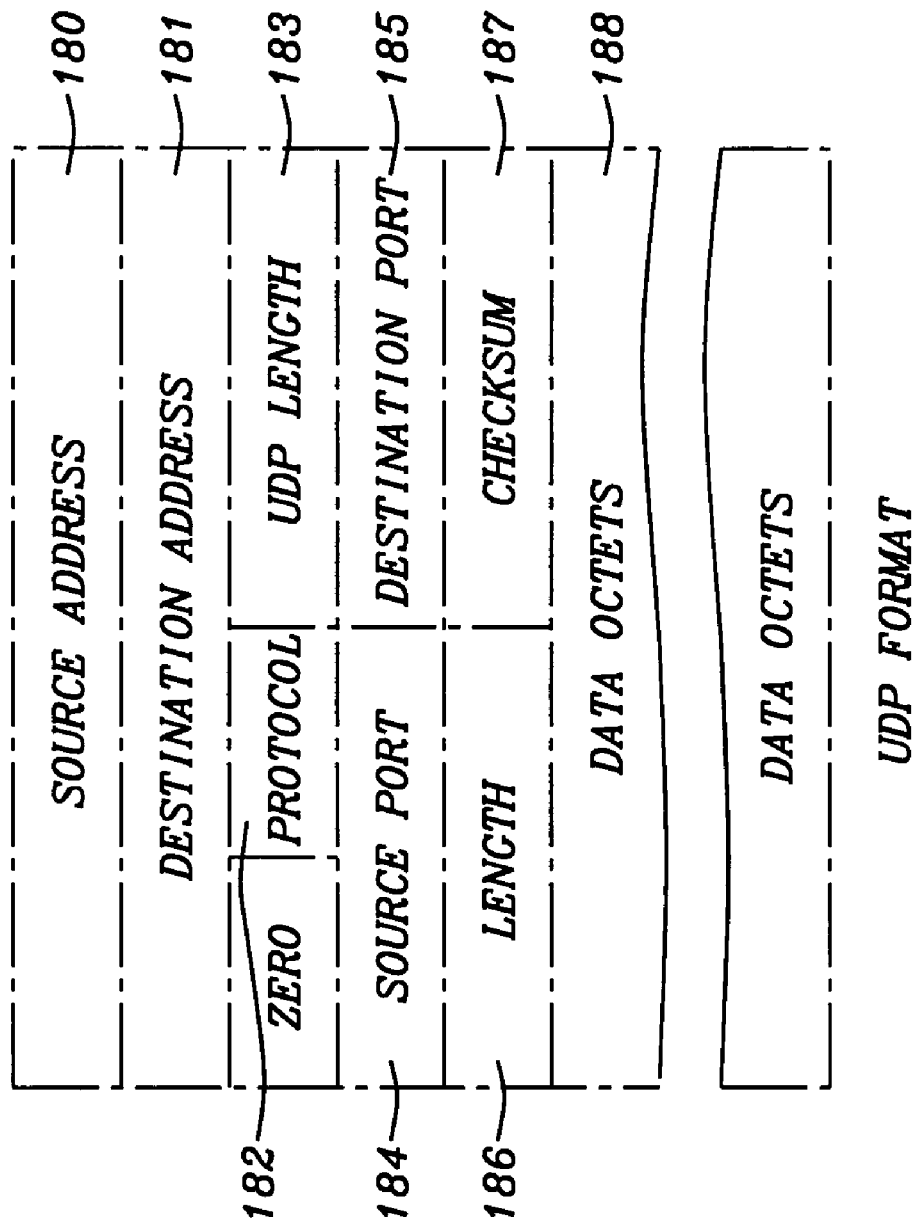
FIG. 11 is an illustration of the User Datagram Protocol (UDP) structure of the command beat.

The cluster bus network 135 of FIG. 8 is a multicast channel, which is primarily used for cluster operations such as join, leave and group election and for the transfer of the data such as the segments of the video files during video on demand operations. These operations employ the protocol, as shown in FIG. 11, to broadcast the messages multiple times and have the messages received by multiple nodes to insure reliability of the transmission of the messages and less the probability of a lost message.

The message contains the real network address (IP address) of the source 180 and destination 181 of the message. The protocol 182 of the message defining the coding of the data octets 188 containing the message. The source port 184 and destination port 185 describes the virtual network addresses for the message. The length field 186 defines the number of data octets 188 being sent and the checksum field 187 provides the checksums of the data octets 188 to determine that the data is received correctly. These messages are used to provide the formation, operation, and fault detection of the cluster of the hierarchical clustered parallel processing system of this invention, as shown in FIG. 12. The configuration service from a higher level service distribution server (Box 200) is used to define the structure and membership of each cluster of computer processor, including any sub-clusters of computer process within the cluster. Once a cluster is defined, a group leader hierarchy (Box 300) is establish to determine which of the processors is performs the cluster supervision and dispatching of jobs for operation. The group leader then performs its own configuration service (Box 400) to configure the structure of the cluster. This includes establishing the cluster topology table, the disk usage table, the node usage table, the cluster map, and the disk access list. The group leader then initiates the heartbeat messages and command beat messages and collects the cluster network status for fault detection and isolation (Box 500).

FIG. 13 shows the definition (Box 200) of the clusters by the configuration service of the service distribution server. The configuration service defines (Box 205) each node within a cluster. In the node definition, the administrator through the configuration service defines the nodes in the cluster, their network (IP) addresses, and the assigned node identifications. The configuration service then defines (Box 210) the disk systems in the cluster by assigning disk identification to all the disk systems in the cluster. The defining (Box 215) of the cluster topology is then performed by the configuration service by creating the disk access list for the defined nodes and the mount points for the disks. The cluster bus network is defined (Box 220) by assigning a multicast network address for the cluster bus and the properties for the cluster bus. The configuration service then defines the important servers that provide services to the cluster not provided by the group leader of the cluster. This involves defining the network (IP) addresses and ports for the distributed servers that perform the billing service, regional title services, distribution service, and gateway services.

Once the nodes, disks, node-disk interconnects, and servers are defined, the configuration service then begins the cluster initialization process (Box 225) of the cluster with the node identification, node network (IP) address, bus information and the disk access list.

Unlike general purpose clusters, which use dynamic group election mechanisms, for added scalability, clusters of the hierarchical clustered parallel processing system of this invention establishes (Box 300) a cluster supervising processor or group leader by creating and (Box 305) maintaining a pre-determined node priority list. The node priority list used in cluster assigns a priority to the nodes based on their node identification for instance a higher priority to nodes with lower node identification. For example, a node with node identification of 0 has the highest priority. The node in the cluster with the highest priority is then selected (Box 310) as the group leader.

A group leader periodically posts a group leader or supervisor notification message on the cluster bus. A supervisor notification message contains the node identification and network (IP) address of the group leader, the cluster topology, and the current cluster map. Once the group leader leaves the cluster gracefully (for maintenance or administration) or due to crash (detected using the fault detection mechanism described below), a new group leader takes over the cluster. Since each node knows the priority list, it knows when it is to assume the group leader position based on the priority. Assuming that the node identification of the current group leader is N and has left the cluster, the node with the next higher node identification (N+1), realizing that the group leader is missing, takes over the cluster by sending a number of cluster supervising processor update message, then regular supervisor notification message on the cluster bus.

If the node with the next higher node identification (N+2) does not see any supervisor notification message on the cluster bus within a time interval (t), it concludes that the node with the node identification (N+1) is also dead, and takes over the cluster using cluster supervising processor update message followed by regular supervisor notification messages.

Similarly, node with the node identification (N+M) waits for the time interval M*t time intervals (i.e. seconds) before taking over the cluster. Once a new group leader is elected, it sends an event to the Service Distribution server to update its server information.

Once a new group leader is determined and the hierarchy of group leadership from the priority listing is established, the group leader performs its own configuration service (Box 400). The group leader stores the cluster topology (Box 405) and a disk usage table (Box 410). The group leader then initializes a node usage table (Box 415), and a cluster map (Box 420). The cluster topology maintains the connection information of the cluster. It itemizes a list of server systems of a server cluster, which can access any of the local disk storage devices. The cluster topology contains the server system identification that is the mount point where a disk is mounted, and the access status of the disk.

The disk usage table maintains the capacity (maximum data rate in Mbps) and the current load (data rate in Mbps) for each disk in the server cluster. The node usage table maintains the streaming capacity (maximum data rate in Mbps) and the current load for each node in the server cluster. The cluster map maintains an up to date list of network address (internet protocol address), port and the status of the important server systems in the distribution system, and it maintains a list of server systems in the cluster their network addresses and their status. A server system can be in one of two states: Live (L) and Failed (D).

If a node is required to be added to or join (Box 425) a cluster, the node boots up and begins a discovery phase. The node discovers the existence of the cluster by tuning to the cluster bus, and listening to the supervisor notification messages. Upon receiving the supervisor notification message, the new added node posts periodic join request messages on the cluster bus. The join request messages contain the node identification, network (IP) address, and the disk access list. The group leader updates its cluster map, and the cluster topology, and posts the new map and topology as a part of the supervisor notification messages. When the new node finds itself in the cluster map, it stops posting join messages.

If the new node has higher priority than the group leader, the group leader bows out by stopping its supervisor notification messages. The new node takes over the cluster by posting cluster supervising processor update message followed by regular supervisor notification messages.

If the original group leader does not see any supervisor notification messages on the cluster bus for time interval (t), it assumes that the new node is dead, and resumes its supervisor notification messages with an updated cluster map.

If a node is required to leave a cluster gracefully for maintenance or administration, it posts periodic leave messages on the cluster bus. The leave message contains the node identification and the network (IP) address. If the leaving node is the group leader, it also includes the node and disk usage tables in the leave message.

The group leader updates its cluster map, and the cluster topology, and posts the new map and topology as a part of the supervisor notification messages. When the new node finds itself removed from the cluster map, it stops posting leave messages, and exits the cluster. If the leaving node is the current group leader, a new group leader is elected according to the priority assigned in the configuration of the cluster.

The cluster initialization process (Box 225) of FIG. 13 begins, as a cluster boots up, with each configured node in the cluster first tuning in to listen to the cluster bus. If each configured node discovers a formed cluster (by receiving the supervisor notification messages), it goes through the join protocol described above to join the existing cluster.

Otherwise, each configured node forms a one-node cluster of its own and starts posting supervisor notification messages on the bus. If multiple one-node clusters form simultaneously, the nodes with lower priority bows out by stopping their supervisor notification messages, and initiating the join protocol.

Figure 16:
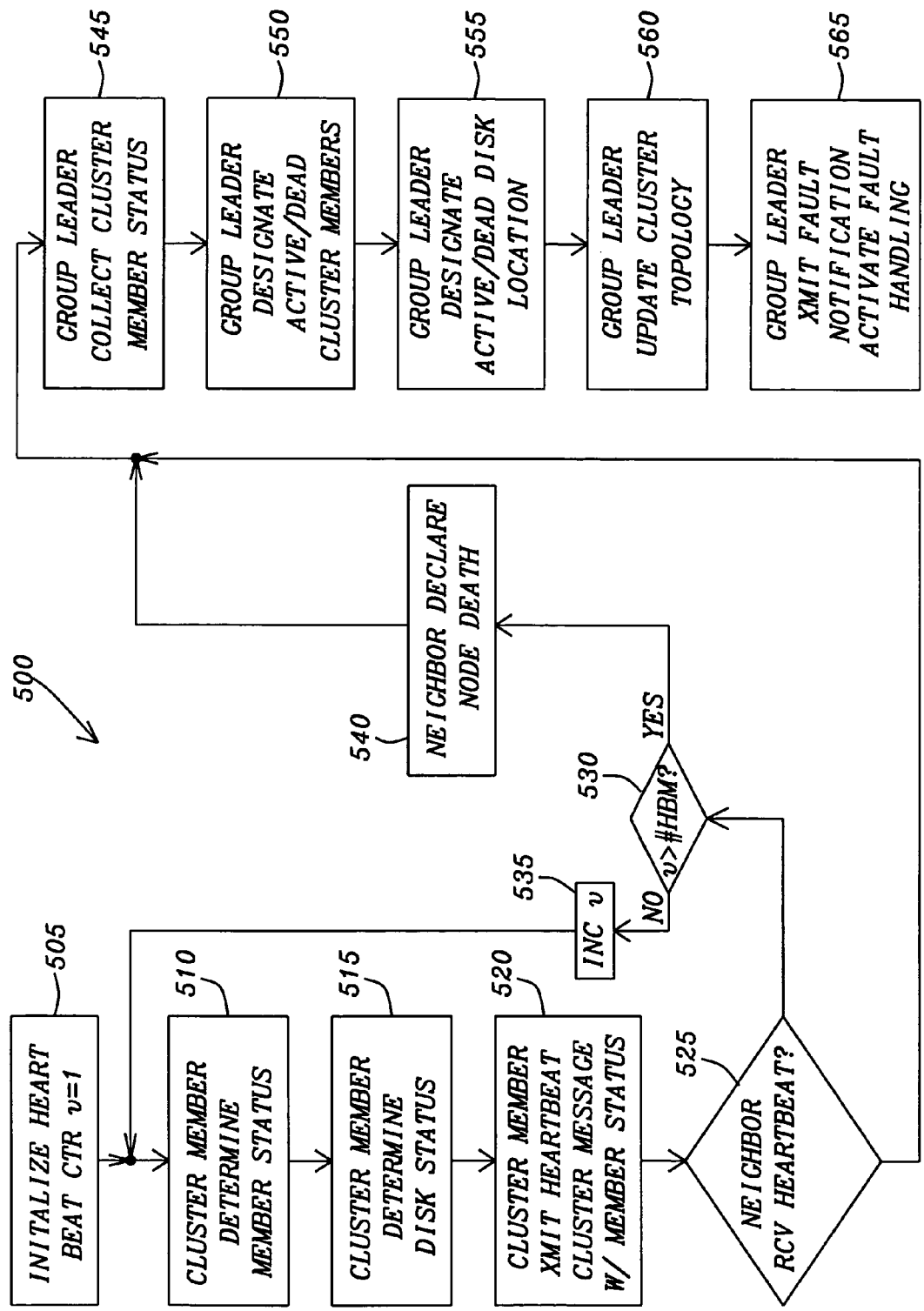
FIG. 16 is a flowchart of the method for fault detection within a cluster of a distributed parallel computer processing system of this invention.

The method for fault detection (Box 500) of FIG. 12 is shown in FIG. 16. Once the cluster is initialized, the nodes in the cluster may optionally form a command ring as shown in FIG. 9 in addition to the cluster bus. If no command ring is formed and the cluster bus is employed for fault detection, each node place a heartbeat on the cluster bus at its time slot as described in FIG. 8. Alternately, for the command ring, each node in the cluster generates a heartbeat message to the next higher priority node, and the highest priority node heartbeats to the lowest priority node, thus, forming the ring.

The fault detection method (Box 500) begins by initializing (Box 505) a heartbeat counter identifying the time slot for the heartbeats. Each member of the cluster determines a member node and disk status (Box 510 and Box 515) The member node then transmits (Box 520) a processor status or heartbeat message. In the case of the members of the cluster using the cluster bus of FIG. 8 for the fault detection process, each member is assigned a timeslot at which it transmits it heartbeat message. In the case of the members using the command ring of FIG. 9 for the fault detection process, each member node receives the heartbeat message from an adjacent member node according to the priority listing. The node then appends its own node status and transmits the received heartbeat message with the appended status as the new heartbeat message to the next adjacent member node according to the priority listing. The adjacent member node or neighbor node listens to determine (Box 510) if the heartbeat message is received (Box 525)

The heartbeat counter is then compared (Box 530) to the number of heartbeats messages (HBM) not received to consider that the previous node is not functioning. If the heartbeat counter determines (Box 530) that the number of heartbeat messages has not been exceeded, the heartbeat counter is incremented (Box 535) and the member node status is determined and resent.

If the heartbeat counter is determined (Box 530) to be greater the number of heartbeat messages not received, the adjacent node declares (Box 540) the neighboring member node to be dead. The adjacent node then posts periodic node death messages on the cluster bus to communicate the declaration (Box 540) of the node failure.

The group leader collects (Box 545) the heartbeat messages and the node death messages defining the cluster status. The group leader designates (Box 550) the active and failed nodes of the cluster and with the disk message of FIG. 10*b* designates (Box 555) the active and failed disk locations within the cluster.

When the group leader then updates (Box 560) the cluster topology and posts the new cluster map in the supervisor notification messages.

Once the node adjacent to a failed node that would be receiving the heartbeat message verifies that the cluster map has been updated with the new death information, it stops posting the node death messages. Once the node that would be transmitting the heartbeat message to the failed node, it stops transmitting the heartbeat messages to the failed node and begins transmitting its heartbeat messages to the next adjacent node designated from the priority list.

If the heartbeat message is in fact a command beat message of FIG. 10 reporting a disk failure, the node receiving the command beat message from the adjacent node assumes the interconnect between the node and the disk to be dead. The adjacent node then posts periodic interconnect death messages on the cluster bus. When the group leader receives the interconnect death message, it updates its cluster topology, and posts the new cluster topology in the supervisor notification messages. Once the adjacent node verifies that the cluster topology has been updated with the new death information, it stops posting the interconnect death messages.

Upon detection of a failed node or a failed disk, the group leader then activates (Box 565) the appropriate fault handling routines. When a node fault or disk fault is detected, all the transfer of video data files from a failing node is reassigned to an active or "live" node, as described above.

Figure 17:
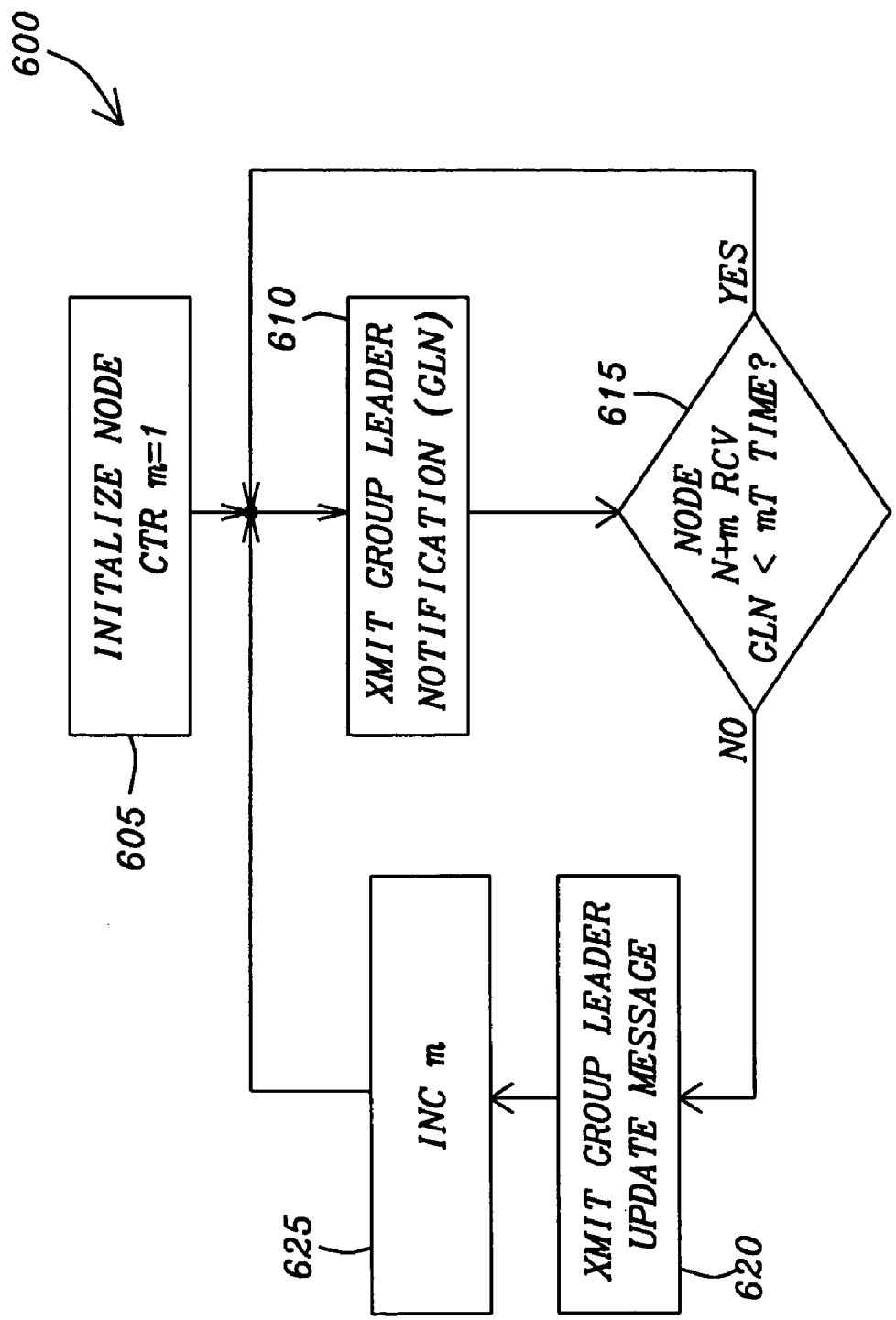
FIG. 17 is a flowchart of the method for group leadership assumption for a cluster of a distributed parallel computer processing system of this invention.

Refer now to FIG. 17, for a discussion of the method (Box 600) for detection of the failure or removal of the group leader from the cluster, and subsequent election of a new group leader. Each node within a cluster initializes (Box 605) a counter (m). The group leader transmits (Box 610) periodic group leader or supervisor notification messages that contain the cluster topology and cluster map. The node with the node identification indicated by the counter m is listening to the cluster bus to determine (Box 615) if the supervisor notification message is received within a period of time that is a multiple of the number m. If the supervisor notification message is received within the time increment the, group leader is functioning properly and the group leader continues to transmit (Box 610) the supervisor notification messages. If the node having the node identification indicated by the counter does not receive the supervisor notification messages within the time (mT), the group leader has failed and the new group leader transmits (Box 620) a group leader update message declaring the new group leader. The node counter m is incremented (Box 625) and the new group leader transmits the group leader or supervisor notification messages (Box 610).

Each node in the cluster maintains an updated cluster topology and cluster map by transmitting the supervisor notification messages. However, the new group leader needs to create the disk usage table and the node usage table to make admission policy decisions. The new group leader initializes these tables, by posting "load queries" on the cluster bus, and receiving "load reports" from all the available nodes in the cluster.

While this invention has been particularly shown and described with reference to the preferred embodiments thereof, it will be understood by those skilled in the art that various changes in form and details may be made without departing from the spirit and scope of the invention.

The invention claimed is:

1. A hierarchical clustered parallel processing system comprising:
    a plurality of cluster nodes, each cluster node comprising at least one computer system cluster, each computer system cluster comprising at least one computer processing system;
    a physical network connected to allow any of said computer processing systems incorporated within said plurality of cluster nodes to communicate with any other of said computer processing systems within said cluster nodes and connected to allow communication between each cluster node;
    a plurality of virtual networks, each virtual network comprising a plurality of said computer processing systems, wherein each computer processing system includes at least one neighbor's listing, each neighbor's listing defining said computer processing system as a member of one of said plurality of said virtual networks and virtually connected through a virtual multicast bus to other member computer processing systems of said virtual network to allow direct and shared communication with the member processors; and
    a configuration service apparatus in communication with each of said computer processing systems to provide each of said plurality of computer processing systems with:
        a neighbor's listing for each of said plurality of virtual networks that each of said plurality of computer systems is a member computer system;
        a node identification to identify one cluster node that each member computer processing system is a member computer processing system,
        a multicast bus address to broadcast communications to said member computer processing systems of said hierarchical cluster by way of said virtual networks to which said member computer processing systems, and
        a cluster node priority list designating a priority for each cluster node within said hierarchical cluster; and
    a cluster supervising processor to provide operational control services for each of said cluster nodes, said cluster supervising processor being selected of said member computer processing systems of each of said cluster nodes according to the priority from said priority list.

2. The hierarchical clustered parallel processing system of claim 1 wherein the configuration service apparatus further provides a disk access list.

3. The configuration service apparatus of claim 2 wherein the disk access list comprises identification of accessible disks, disk mount points, and failure detection locations.

4. The hierarchical clustered parallel processing system of claim 1 wherein the cluster supervising processor maintains:
    a cluster topology table detailing connectivity for each computer processing system of the cluster node and a disk access status for each disk within said cluster node;
    a disk usage table describing current capacity and loading for each disk within said cluster node;
    a node usage table describing a streaming capacity for each computer processing system of said cluster and a current loading for each computer processing system of said cluster; and
    a cluster map describing network addresses for each of a plurality of servers in communication with said cluster node and listing of computer processing systems within said cluster, network addresses for said computer processing systems, and an operational status of said computer processing systems.

5. The hierarchical clustered parallel processing system of claim 4 wherein the each cluster node of computer processing systems further comprises a fault detection apparatus within each member computer processing system:
    to periodically receive a first processor status message from a first adjacent node;
    to append a second processor status message of a current node to said first processor status message; and
    to periodically transmit said first and second processor status message to a second adjacent node.

6. The hierarchical clustered parallel processing system of claim 5 wherein said cluster supervising processor receives an accumulation of the processor status messages from all cluster nodes.

7. The hierarchical clustered parallel processing system of claim 5 wherein, if the fault detection apparatus does not receive said first processor status message for a number of periods, said first adjacent node is declared to have failed and a failure declaration is appended to said second processor status message.

8. The hierarchical clustered parallel processing system of claim 7 wherein, upon receipt of said failure declaration, the cluster supervising processor modifies said cluster map to reflect failure of the cluster node.

9. The hierarchical clustered parallel processing system of claim 4 wherein the cluster supervising processor periodically posts a supervisor notification message on said virtual multicast bus, said supervisor notification message comprises a node identification and a network address for said cluster supervising processor.

10. The hierarchical clustered parallel processing system of claim 9 wherein the supervisor notification message further comprises the cluster topology and a current cluster map.

11. The hierarchical clustered parallel processing system of claim 9 wherein, if one cluster node does not receive said supervisor notification message within a notification time, said node becomes said cluster supervising processor, updates said cluster topology table and said cluster map, transmits a cluster supervising processor update message, and the supervisor notification message.

12. The hierarchical clustered parallel processing system of claim 9 wherein a new cluster node joins said virtual network by the steps of:
listening to said virtual multicast bus for a supervisor notification message from the present cluster supervising processor;
posting on said virtual multicast bus a join request message providing a node identification, a network address for said node, and a disk access list for said cluster node;
updating by the present cluster supervising processor the cluster map and the cluster topology; and
placing a new supervisor notification message upon said virtual multicast bus including said new cluster node.

13. The hierarchical clustered parallel processing system of claim 12 wherein the new cluster node joins said virtual network further by the step of:
ceasing posting on said virtual multicast bus said join request message.

14. The hierarchical clustered parallel processing system of claim 12 wherein the new cluster node becomes the cluster supervising processor, if said new cluster node has a priority that supercedes said present cluster supervising processor.

15. The hierarchical clustered parallel processing system of claim 14 wherein the new cluster node acting as the present cluster supervising processor transmits the supervisor notification message and the original cluster supervising processor ceases transmitting said supervisor notification message.

16. The hierarchical clustered parallel processing system of claim 15 wherein if the new cluster node does not transmit the supervisor notification message by the notification time, the original cluster supervising processor resumes transmission of the supervisor notification message.

17. The hierarchical clustered parallel processing system of claim 9 wherein one cluster node leaves one virtual network by the steps of:
posting a leave message on said virtual multicast bus, said leave message containing the node identification and the network address for said cluster node;
updating by the cluster supervising processor of the cluster map and the cluster topology; and
posting on the virtual multicast bus the supervisor notification message with the updated cluster map and cluster topology.

18. The hierarchical clustered parallel processing system of claim 17 wherein the node leaving the virtual network ceases posting the leave message upon receipt of the supervisor notification message with the updated cluster map and cluster topology.

19. The hierarchical clustered parallel processing system of claim 17 wherein if the cluster node leaving the virtual network is the cluster supervising processor, the cluster node with the highest priority on the priority list then becomes the cluster supervising processor.

20. The hierarchical clustered parallel processing system of claim 4 wherein:
each cluster node periodically determines whether each disk to which said cluster node has access is functioning and if any disk is not functioning;
the cluster node creates a disk failure message for the disk not functioning for transfer to an adjacent cluster node;
wherein said adjacent cluster node transfers said disk failure message to subsequent adjacent cluster nodes until said cluster supervising processor receives said disk failure message;
wherein upon receipt of multiple disk failure messages from multiple cluster nodes for the disk not functioning, the cluster supervising processor declares a disk failure, updates the disk usage table, and reassigns all the transfer of data files from a failing node to an active node.

21. The hierarchical clustered parallel processing system of claim 1 wherein a group of said member computer processing systems of said cluster nodes are configured as a sub-cluster, said sub-cluster being a sub-node of said virtual network.

22. The hierarchical clustered parallel processing system of claim 1 wherein said virtual network is formed and said cluster supervising processor is designated by the steps of:
listening to said virtual multicast bus for a supervisor notification message from the cluster supervising processor by each cluster node of the virtual network;
if no supervisor notification message is received, designating each cluster node a single node virtual network of its own;
designating each cluster node the cluster supervising processor of its single node virtual network;
transmitting by each cluster supervising processor of each single node virtual network the supervisor notification message for each single node cluster;
ceasing by those cluster nodes having a lower priority from transmitting supervisor notification messages such that the cluster node with a highest priority is the cluster supervising processor; and
joining said virtual network by those nodes with lower priority by posting on said virtual multicast bus a join request message providing a node identification, a network address for said cluster node, and a disk access list for said cluster node.

23. A virtual network formed within a plurality of clusters of computer processing systems interconnected by a physical network to allow each computer processing system of the clusters of computer processing systems to transfer data between any of the plurality of computer processing systems, said virtual network comprising:
a plurality of nodes, each node comprising at least one computer system cluster designated to be a member of said virtual network, each computer system cluster comprising at least one of said computer processing systems;
a virtual multicast bus to provide communication between member nodes of said virtual network; and a configuration service apparatus in communication with each of the computer systems to provide each of the plurality of computer systems with:
a neighbor's listing for each of said computer processing systems included in a member node of said virtual network, a separate neighbor's listing associated with any virtual network included within said a plurality of clusters;
a node identification to identify a node for each member computer processing system within said cluster,
a multicast bus address to broadcast communications to said member nodes of said virtual network by way of said virtual multicast bus, and
a node priority list designating a priority for each member node within said virtual network; and
a cluster supervising processor to provide operational control services for each of said member nodes, said cluster supervising processor being selected of said computer systems within said nodes according to the priority from said priority list.

24. The virtual network of claim 23 wherein the configuration service apparatus further provides a disk access list.

25. The virtual network of claim 24 wherein the disk access list comprises identification of accessible disks, disk mount points, and failure detection locations.

26. The virtual network of claim 23 wherein the cluster supervising processor maintains:
a cluster topology table detailing connectivity for each node of the virtual network and a disk access status for each disk within said virtual network;
a disk usage table describing current capacity and loading for each disk within said virtual network;
a node usage table describing a streaming capacity for each node of said virtual network and a current loading for each node of said virtual network; and
a cluster map describing network addresses for each of a plurality of servers in communication with said virtual network and listing of nodes within said virtual network, network addresses for said nodes, and an operational status of said nodes.

27. The virtual network of claim 26 further comprising a fault detection apparatus within each computer processing system of said member nodes:
to periodically receive a first processor status message from a first adjacent node;
to append a second processor status message of a current node to said first processor status message; and
to periodically transmit said first and second processor status message to a second adjacent node.

28. The virtual network of claim 27 wherein said cluster supervising processor receives an accumulation of the processor status messages from all nodes of said virtual network.

29. The virtual network of claim 27 wherein, if the fault detection apparatus does not receive said first processor status message for a number of periods, said first adjacent node is declared to have failed and a failure declaration is appended to said second processor status message.

30. The virtual network of claim 29 wherein, upon receipt of said failure declaration, the cluster supervising processor modifies said cluster map to reflect failure of the node.

31. The virtual network of claim 26 wherein the cluster supervising processor periodically posts a supervisor notification message on said virtual multicast bus, said supervisor notification message comprises a node identification and a network address for said cluster supervising processor.

32. The virtual network of claim 31 wherein the supervisor notification message further comprises the cluster topology and a current cluster map.

33. The virtual network of claim 31 wherein, if one node of said virtual network does not receive said supervisor notification message within a notification time, said node becomes said cluster supervising processor, updates said cluster topology table and said cluster map, transmits a cluster supervising processor update message, and the supervisor notification message.

34. The virtual network of claim 31 wherein a new node joins said virtual network by the steps of:
listening to said virtual multicast bus for a supervisor notification message from the present cluster supervising processor;
posting on said virtual multicast bus a join request message providing a node identification, a network address for said node, and a disk access list for said node;
updating by the present cluster supervising processor the cluster map and the cluster topology; and
placing a new supervisor notification message upon said virtual multicast bus including said new node.

35. The virtual network of claim 34 wherein the new node joins said virtual network further by the steps of:
ceasing posting on said virtual multicast bus said join request message.

36. The virtual network of claim 34 wherein the new node becomes the cluster supervising processor, if said new node has a priority that supercedes said present cluster supervising processor.

37. The virtual network of claim 36 wherein the new node acting as the present cluster supervising processor transmits the supervisor notification message and the original cluster supervising processor ceases transmitting said supervisor notification message.

38. The virtual network of claim 37 wherein if the new node does not transmit the supervisor notification message by the notification time, the original cluster supervising processor resumes transmission of the supervisor notification message.

39. The virtual network of claim 31 wherein a node leaves said virtual network by the steps of:
posting a leave message on said virtual multicast bus, said leave message containing the node identification and the network address for said node;
updating by the cluster supervising processor of the cluster map and the cluster topology; and
posting on the virtual multicast bus the supervisor notification message with the updated cluster map and cluster topology.

40. The virtual network of claim 39 wherein the node leaving the virtual network ceases posting the leave message upon receipt of the supervisor notification message with the updated cluster map and cluster topology.

41. The virtual network of claim 39 wherein if the node leaving said virtual network is the cluster supervising processor, the node with the highest priority listed the priority list then becomes the cluster supervising processor.

42. The virtual network claim 26 wherein:
each node of said virtual network periodically determines whether each disk to which said node has access is functioning and if any disk is not functioning;
the node creates a disk failure message for the disk not functioning for transfer to an adjacent node;
wherein said adjacent node transfers said disk failure node to subsequent adjacent nodes until said cluster supervising processor receives said disk failure message;

wherein upon receipt of multiple disk failure messages from multiple nodes for the disk not functioning, the cluster supervising processor declares a disk failure, updates the disk usage table, and reassigns all the transfer of data files from a failing node to an active node.

43. The virtual network of claim 23 wherein a group of said computer systems of said plurality of clusters of computer processing systems are configured as a sub-cluster, said sub-cluster being a node of said virtual network.

44. The virtual network of claim 23 wherein said virtual network is formed and said cluster supervising processor is designated by the steps of:
   listening to said virtual multicast bus for a supervisor notification message from the cluster supervising processor by each node of the cluster;
   if no supervisor notification message is received, designating each node a single node virtual network of its own;
   designating each node the virtual network supervising processor of its single node cluster;
   transmitting by each cluster supervising processor of each single node virtual network the supervisor notification message for each single node cluster;
   ceasing by those nodes having a lower priority from transmitting supervisor notification messages such that the node with a highest priority is the virtual network supervising processor; and
   joining said virtual network by those nodes with lower priority by posting on said virtual multicast bus a join request message providing a node identification, a network address for said node, and a disk access list for said node.

45. A method for forming a virtual network within a plurality of clusters of computer processing systems interconnected by a physical network to allow each computer processing system of the clusters of computer processing systems to transfer data between any of the plurality of computer systems, said method for forming said virtual network comprising steps of:
   creating a plurality of nodes such that each node comprises at least one computer system cluster designated to be a member of said virtual network, each computer system cluster comprising at least one of said computer processing systems;
   providing communication between member nodes of said virtual network through a virtual multicast bus; and
   establishing a configuration service apparatus communicating with each of said computer systems;
   transferring from said configuration service apparatus to each of the plurality of computer processing systems:
      a neighbor's listing for each of said computer processing systems included in a member node of said virtual network, a separate neighbor's listing associated with any virtual network included within said a plurality of clusters;
      a node identification to identify a node for each member computer processing system within said cluster,
      a multicast bus address to broadcast communications to said member nodes of said virtual network by way of said virtual multicast bus, and
      a node priority list designating a priority for each member node within said virtual network; and
   selecting one of said computer systems within said nodes according to the priority from said priority list to be a cluster supervising processor to provide operational control services for each of said member nodes.

46. The method for forming said virtual network of claim 45 wherein transferring from said configuration service apparatus to each of the plurality of computer systems a disk access list.

47. The method for forming said virtual network of claim 46 wherein the disk access list comprises identification of accessible disks, disk mount points, and failure detection locations.

48. The method for forming said virtual network of claim 45 further comprising the step of maintaining by said cluster supervising processor:
   a cluster topology table detailing connectivity for each node of the virtual network and a disk access status for each disk within said virtual network;
   a disk usage table describing current capacity and loading for each disk within said virtual network;
   a node usage table describing a streaming capacity for each node of said virtual network and a current loading for each node of said virtual network; and
   a cluster map describing network addresses for each of a plurality of servers in communication with said virtual network and listing of nodes within said virtual network, network addresses for said nodes, and an operational status of said nodes.

49. The method for forming said virtual network of claim 48 further comprising the step of:
   detecting faults within each computer processing system of said member nodes by the steps of:
      periodically receiving a first processor status message from a first adjacent node and transmit;
      appending a second processor status message of a current node to said first processor status message; and
      periodically transmitting said first and second processor status message to a second adjacent node.

50. The method for forming said virtual network of claim 49 wherein detecting faults within each computer processing system further comprises the step of receiving an accumulation of the processor status messages from all nodes of said virtual network.

51. The method for forming said virtual network of claim 49 wherein, detecting faults within each computer processing system further comprises the step of:
   declaring said first adjacent node to have failed, if said first processor status message for a number of periods is not received;
   appending a failure declaration to said second processor status message.

52. The method for forming said virtual network of claim 51 wherein detecting faults within each computer processing system further comprising the step of modifying said cluster map to reflect failure of the node, upon receipt of said failure declaration.

53. The method for forming said virtual network of claim 48 wherein maintaining by said cluster supervising processor comprises the step of posting a supervisor notification message on said virtual multicast bus, said supervisor notification message comprises a node identification and a network address for a cluster supervising processor.

54. The method for forming said virtual network of claim 53 wherein the supervisor notification message further comprises the cluster topology and a current cluster map.

55. The method for forming said virtual network of claim 53 wherein maintaining by said cluster supervising processor further comprises the steps of:
- becoming said cluster supervising processor by one node of said virtual network if said one node does not receive said supervisor notification message within a notification time;
- updating by said one node said cluster topology table and said cluster map; and
- transmitting by said one a cluster supervising processor update message, and the supervisor notification message.

56. The method for forming said virtual network of claim 53 further comprising the step of joining a new node to said virtual network by the steps of:
- listening to said virtual multicast bus for a supervisor notification message from the present cluster supervising processor;
- posting on said virtual multicast bus a join request message providing a node identification, a network address for said node, and a disk access list for said node;
- updating by the present cluster supervising processor the cluster map and the cluster topology; and
- placing a new supervisor notification message upon said virtual multicast bus including said new node.

57. The method for forming said virtual network of claim 56 wherein joining a new node to said virtual network further by the step of:
- ceasing posting on said virtual multicast bus said join request message.

58. The method for forming said virtual network of claim 56 wherein joining a new node to said virtual network further comprises the step of establishing said new node as the cluster supervising processor, if said new node has a priority that supercedes said present cluster supervising processor.

59. The method for forming said virtual network of claim 58 wherein establishing said new node as the cluster supervising processor comprises the steps of transmitting by said present cluster supervising processor said supervisor notification message and ceasing transmitting by said original cluster supervising processor said supervisor notification message.

60. The method for forming said virtual network of claim 59 wherein establishing said new node as the cluster supervising processor further comprises the step of resuming transmission of the supervisor notification message by the original cluster supervising processor, if said new node does not transmit the supervisor notification message by said notification time.

61. The method for forming said virtual network of claim 53 wherein further comprising the step of leaving said virtual network by one node by the steps of:
- posting a leave message on said virtual multicast bus, said leave message containing the node identification and the network address for said node;
- updating by the cluster supervising processor of the cluster map and the cluster topology; and
- posting on the virtual multicast bus the supervisor notification message with the updated cluster map and cluster topology.

62. The method for forming said virtual network of claim 61 wherein leaving said virtual network by a node further comprises the step of ceasing posting the leave message upon receipt of the supervisor notification message with the updated cluster map and cluster topology by the node leaving the virtual network.

63. The method for forming said virtual network of claim 61 wherein leaving said virtual network by a node further comprises the step of establishing the cluster supervising processor as the node with the highest priority listed the priority list, if the node leaving said virtual network is the cluster supervising processor.

64. The virtual network claim 48 wherein maintaining by said cluster supervising processor comprises the steps of:
- periodically determining by each node of said virtual network whether each disk to which said node has access is functioning and if any disk is not functioning;
- creating by said node a disk failure message for the disk not functioning for transfer to an adjacent node;
- transferring by said adjacent node said disk failure node to subsequent adjacent nodes until said cluster supervising processor receives said disk failure message;
- declaring by said cluster supervising processor a disk failure, updating the disk usage table, and reassigning all the transfer of data files from a failing node to an active node, upon receipt of multiple disk failure messages from multiple nodes for the disk not functioning.

65. The method for forming said virtual network of claim 45 wherein creating a plurality of nodes comprises the steps of:
- configuring a group of said computer systems of said plurality of clusters of computer processing systems are as a sub-cluster; and
- creating one node of said virtual network from said sub-cluster.

66. The method for forming said virtual network of claim 45 wherein forming said virtual network and selecting one of said computer systems within said nodes to be said cluster supervising processor further comprise the steps of:
- listening to said virtual multicast bus for a supervisor notification message from the cluster supervising processor by each node of the cluster;
- if no supervisor notification message is received, designating each node a single node virtual network of its own;
- designating each node the virtual network supervising processor of its single node cluster;
- transmitting by each cluster supervising processor of each single node virtual network the supervisor notification message for each single node cluster;
- ceasing by those nodes having a lower priority from transmitting supervisor notification messages such that the node with a highest priority is the virtual network supervising processor; and
- joining said virtual network by those nodes with lower priority by posting on said virtual multicast bus a join request message providing a node identification, a network address for said node, and a disk access list for said node.

* * * * *

UNITED STATES PATENT AND TRADEMARK OFFICE
CERTIFICATE OF CORRECTION

PATENT NO. : 7,287,180 B1  
APPLICATION NO. : 10/804657  
DATED : October 23, 2007  
INVENTOR(S) : Monsong Chen et al.

Page 1 of 1

It is certified that error appears in the above-identified patent and that said Letters Patent is hereby corrected as shown below:

Title Page in the Assignees, (73), delete Assignee, "Info Valve Computing, Inc., Elms Gord, NY (US)" and replace with -- InfoValue Computing, Inc., Elmsford, NY (US) --.

Signed and Sealed this

Twenty-ninth Day of April, 2008

JON W. DUDAS  
*Director of the United States Patent and Trademark Office*